(12) United States Patent
Ogawa et al.

(10) Patent No.: US 10,259,327 B2
(45) Date of Patent: Apr. 16, 2019

(54) VEHICLE SYSTEM AND CONTROL METHOD THEREFOR

(71) Applicant: KABUSHIKI KAISHA TOSHIBA, Minato-ku, Tokyo (JP)

(72) Inventors: Kotaro Ogawa, Fuchu Tokyo (JP); Masaki Sato, Hachioji Tokyo (JP); Tatsuya Arai, Fuchu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 41 days.

(21) Appl. No.: 15/329,494

(22) PCT Filed: Aug. 20, 2014

(86) PCT No.: PCT/JP2014/071795
§ 371 (c)(1),
(2) Date: Jan. 26, 2017

(87) PCT Pub. No.: WO2016/017040
PCT Pub. Date: Feb. 4, 2016

(65) Prior Publication Data
US 2017/0297432 A1    Oct. 19, 2017

(30) Foreign Application Priority Data

Jul. 30, 2014    (JP) .................... 2014-155540

(51) Int. Cl.
*B60L 3/00*        (2006.01)
*B60L 13/00*       (2006.01)
(Continued)

(52) U.S. Cl.
CPC .......... *B60L 3/0046* (2013.01); *B60L 3/0023* (2013.01); *B60L 3/0069* (2013.01); *B60L 3/12* (2013.01);
(Continued)

(58) Field of Classification Search
CPC ...... B60L 3/0046; B60L 11/1861; B60L 5/18; B60L 2200/30; B60L 2240/10; B60M 7/003
See application file for complete search history.

(56) References Cited

U.S. PATENT DOCUMENTS 2,812,617 A * 11/1957 Longarzo ............... A63H 19/26
                                                    446/439
3,828,684 A *  8/1974 Figari .................... B61B 12/02
                                                    104/112
(Continued)

FOREIGN PATENT DOCUMENTS

CN    102318162 A    1/2012
CN    102668318 A    9/2012
(Continued)

OTHER PUBLICATIONS

International Search Report (and English translation thereof) dated Nov. 18, 2014 issued in counterpart International Application No. PCT/JP2014/071795.

*Primary Examiner* — Behrang Badii
*Assistant Examiner* — Daniel L Greene
(74) *Attorney, Agent, or Firm* — Holtz, Holtz & Volek PC

(57) ABSTRACT

A vehicle system includes an instructing portion that issues open/close instructions for a charging disconnector, a discharging disconnector, and a pair of contactors. A diagnosis start determination portion determines a diagnosis start timing before entering a trolleyless section. A remaining battery capacity checks whether a battery unit has a battery capacity necessary in a trolleyless section travel. A relay operation check portion checks operability of a charging disconnector, the discharging disconnector, and the pair of contactors based on certain open/close states of a plurality of relays depending on the open/close instructions. An abnormality determination portion determines trolleyless section (Continued)

travel is not allowed when the relay operation check portion is incapable of checking operability or necessary remaining battery capacity, the remaining battery capacity check portion, the relay operation check portion, and the abnormality determination portion being operated when the diagnosis start determination portion determines that it is diagnosis start timing.

10 Claims, 22 Drawing Sheets

(51) Int. Cl.
    *B60L 11/18*         (2006.01)
    *B60M 7/00*         (2006.01)
    *B60L 3/12*          (2006.01)
    *B60L 5/18*          (2006.01)

(52) U.S. Cl.
    CPC ....... *B60L 11/1801* (2013.01); *B60L 11/1837* (2013.01); *B60L 11/1861* (2013.01); *B60L 13/00* (2013.01); *B60M 7/003* (2013.01); *B60L 5/18* (2013.01); *B60L 2200/30* (2013.01); *B60L 2240/10* (2013.01); *B60L 2240/80* (2013.01); *Y02T 30/12* (2013.01)

(56) References Cited

U.S. PATENT DOCUMENTS

| | | | | |
|---|---|---|---|---|
| RE29,994 E | * | 5/1979 | Bossi | B60L 11/18 |
| | | | | 191/1 R |
| 4,483,148 A | * | 11/1984 | Minami | B60L 9/22 |
| | | | | 180/65.245 |
| 5,850,209 A | * | 12/1998 | Lemke | G06F 1/1601 |
| | | | | 345/156 |
| 2009/0121678 A1 | | 5/2009 | Mitake et al. | |
| 2010/0070133 A1 | | 3/2010 | Ishishita | |
| 2011/0193413 A1 | * | 8/2011 | Kudo | H02J 7/0018 |
| | | | | 307/77 |
| 2011/0284699 A1 | * | 11/2011 | Cooper | B61L 3/20 |
| | | | | 246/28 R |
| 2011/0284700 A1 | * | 11/2011 | Brand | B61L 15/0036 |
| | | | | 246/28 R |
| 2011/0285350 A1 | | 11/2011 | Mitsutani | |
| 2012/0160124 A1 | * | 6/2012 | Barbee | B61C 3/02 |
| | | | | 105/35 |
| 2013/0229052 A1 | | 9/2013 | Kitanaka | |
| 2013/0325303 A1 | * | 12/2013 | Kiuchi | G01R 31/3624 |
| | | | | 701/112 |
| 2014/0138493 A1 | * | 5/2014 | Noffsinger | B61L 23/044 |
| | | | | 246/121 |
| 2014/0207317 A1 | * | 7/2014 | Noffsinger | B61K 9/10 |
| | | | | 701/19 |
| 2015/0115703 A1 | | 4/2015 | Hatanaka | |
| 2015/0188451 A1 | * | 7/2015 | Nishikawa | G01R 31/008 |
| | | | | 318/438 |
| 2015/0276555 A1 | * | 10/2015 | Bourgoin | G01R 31/008 |
| | | | | 702/122 |
| 2016/0001748 A1 | * | 1/2016 | Moskowitz | B60K 1/04 |
| | | | | 701/22 |

FOREIGN PATENT DOCUMENTS

| | | |
|---|---|---|
| CN | 102991363 A | 3/2013 |
| CN | 203005126 U | 6/2013 |
| EP | 2241472 A1 | 10/2010 |
| EP | 2501017 A1 | 9/2012 |
| JP | 0698409 A | 4/1994 |
| JP | 2000083302 A | 3/2000 |
| JP | 2005037230 A | 2/2005 |
| JP | 2005327562 A | 11/2005 |
| JP | 2008118761 A | 5/2008 |
| JP | 2008211939 A | 9/2008 |
| JP | 2008220088 A | 9/2008 |
| JP | 2008301612 A | 12/2008 |
| JP | 2009273198 A | 11/2009 |
| JP | 2010183771 A | 8/2010 |
| JP | 2010252524 A | 11/2010 |
| JP | 2011004546 A | 1/2011 |
| JP | 2013027204 A | 2/2013 |
| WO | 2012073351 A1 | 6/2012 |
| WO | 2013145191 A1 | 10/2013 |

* cited by examiner

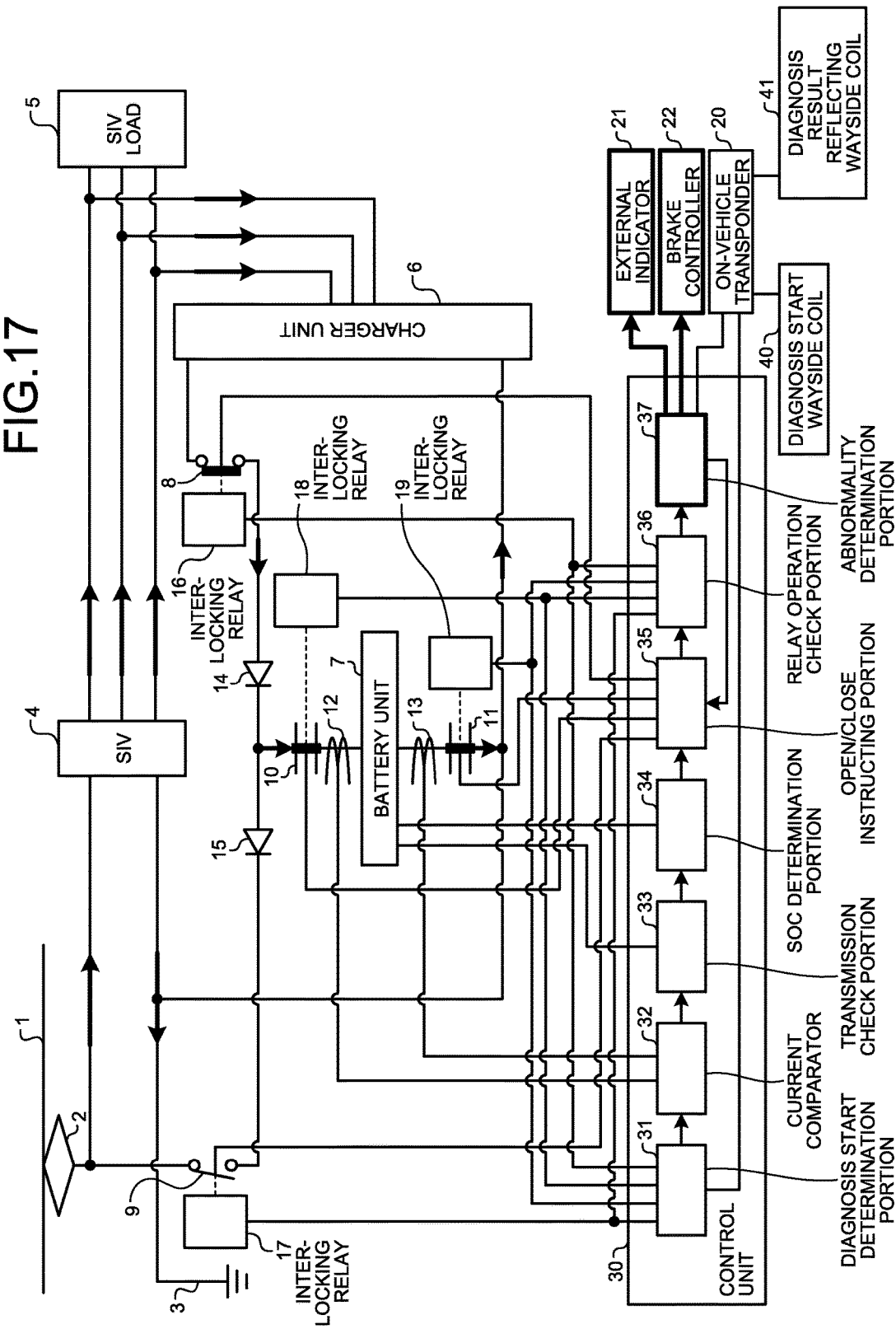

VEHICLE SYSTEM AND CONTROL METHOD THEREFOR

CROSS-REFERENCE TO RELATED APPLICATIONS

This application is national stage application of International Application No. PCT/JP2014/071795, filed Aug. 20, 2014, which designates the United States, incorporated herein by reference, and which claims the benefit of priority from Japanese Patent Application No. 2014-155540, filed Jul. 30, 2014, the entire contents of which are incorporated herein by reference.

FIELD

Embodiments described herein relate generally to a vehicle system and a control method.

BACKGROUND

In recent years, taking into consideration of surrounding landscapes or new installation costs of power supply facilities, many railway operators make a line routing plan by routing travel lines in a trolleyless manner without installing a trolley and operating an electric vehicle installed with a battery unit as a power source on a trolleyless section.

However, components used in a trolley section installed with trolleys are different from those used in a trolleyless section installed with no trolley. Therefore, if a failure occurs in a component used in the trolleyless section, a driver and a vehicle system may be difficult to notice the failure in the trolley section and finally notice it for the first time after entering the trolleyless section from the trolley section. In this case, a travel of the vehicle is not allowed on the trolleyless section, and the vehicle is stuck on the trolleyless section. This may generate a significant delay in a schedule diagram.

An object of the present invention is to provide a vehicle system and a control method therefor capable of minimizing confusion in a schedule diagram, that may be generated when a failure occurs in a component used in a trolleyless section, by diagnosing operability of the component used in the trolleyless section travel during a trolley section travel in advance and disabling the trolleyless section travel when it is impossible to check the operability.

BRIEF DESCRIPTION OF DRAWINGS

FIG. 17 is a diagram illustrating a circuit operation on the operational flowchart of FIG. 4;

DETAILED DESCRIPTION

In general, according to one embodiment, a vehicle system comprises a battery unit serving as a power source in a trolleyless section; a charging disconnector and a discharging disconnector for changing over a charging/discharging state of the battery unit and a pair of contactors provided in positive and negative sides of the battery unit; a plurality of relays interlocking with open/close operations of each of the charging disconnector, the discharging disconnector, and the pair of contactors; an open/close instructing portion that issues open/close instructions for the charging disconnector, the discharging disconnector, and the pair of contactors; a diagnosis start determination portion that determines a diagnosis start timing before entering a trolleyless section; a remaining battery capacity check portion operated when the diagnosis start determination portion determines that it is a diagnosis start timing, the remaining battery capacity check portion checking whether or not the battery unit has a battery capacity necessary in a trolleyless section travel; a relay operation check portion that checks operability of the charging disconnector, the discharging disconnector, and the pair of contactors based on certain open/close states of the plurality of relays depending on the open/close instructions from the open/close instructing portion; and an abnormality determination portion that determines that the trolleyless section travel is not allowed when the relay operation check portion is incapable of checking the operability or the necessary remaining battery capacity, the remaining battery capacity check portion, the relay operation check portion, and the abnormality determination portion being operated when the diagnosis start determination portion determines that it is the diagnosis start timing.

First Embodiment

A vehicle system according to a first embodiment will now be described in detail with reference to FIGS. 1 to 17.

Figure 1:
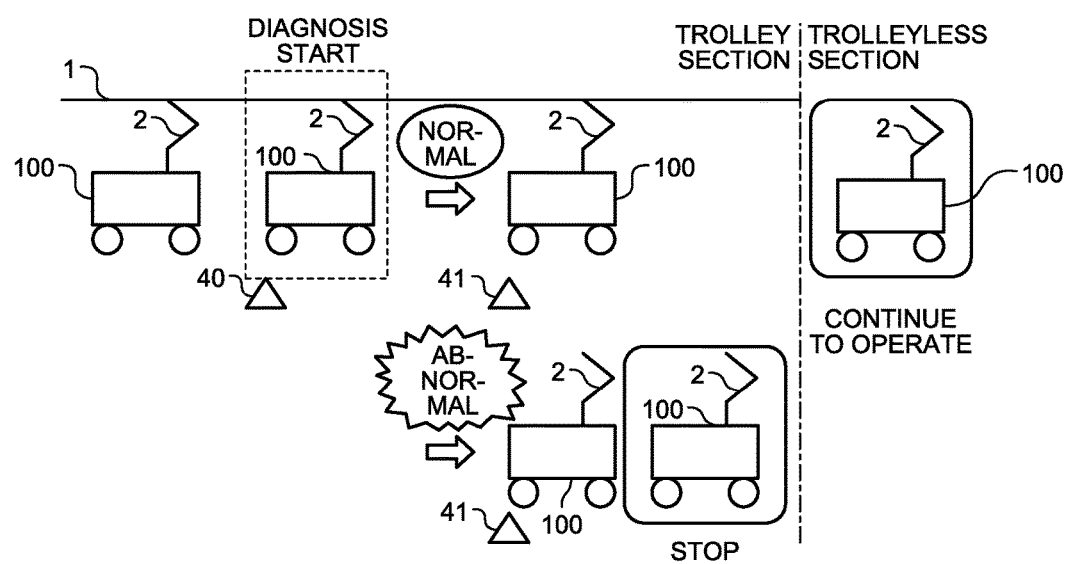
FIG. 1 is a diagram schematically illustrating a vehicle system according to a first embodiment.
Figure 2:
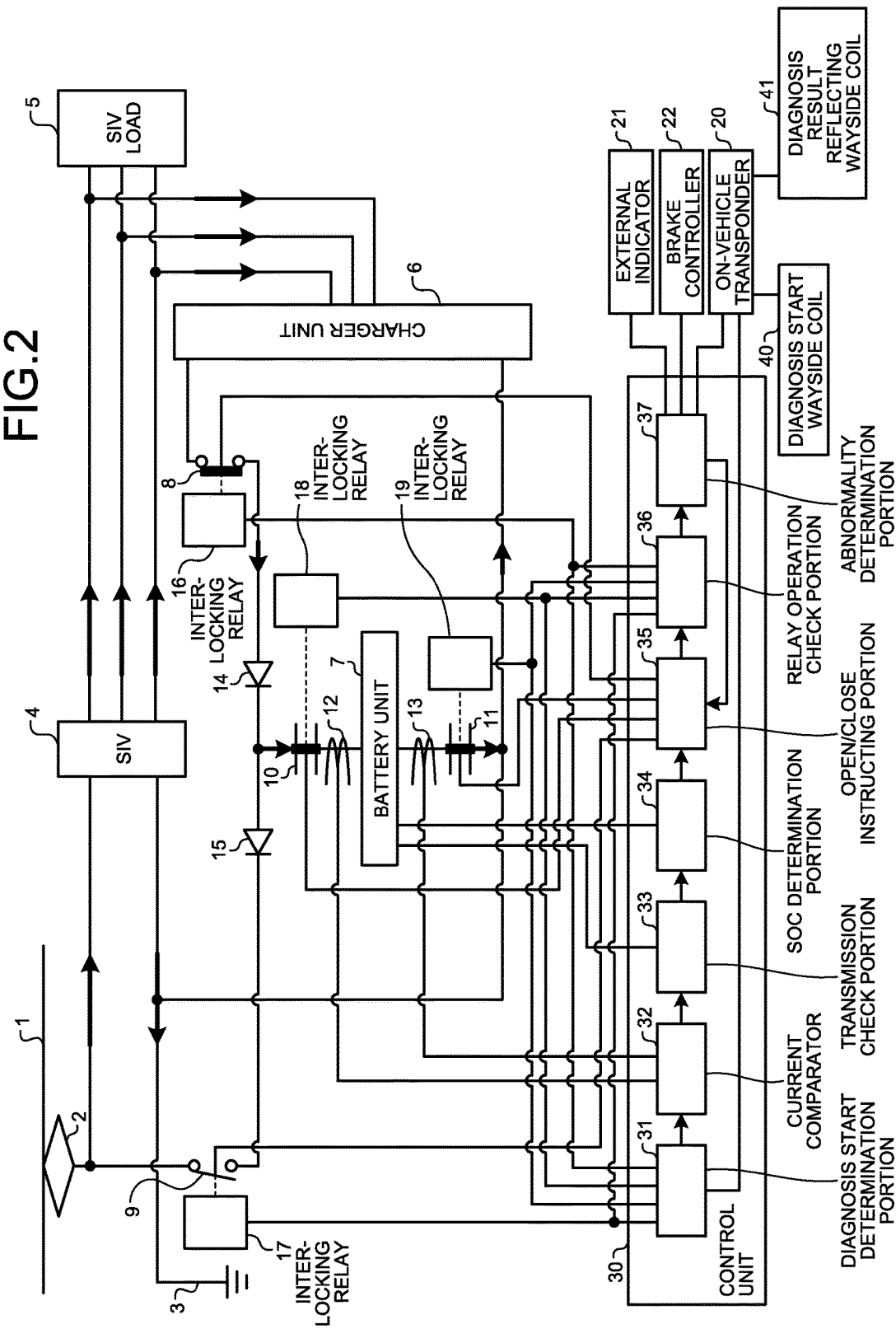
FIG. 2 is a diagram illustrating a circuit when an electric vehicle according to the first embodiment travels on a trolley section.
Figure 3:
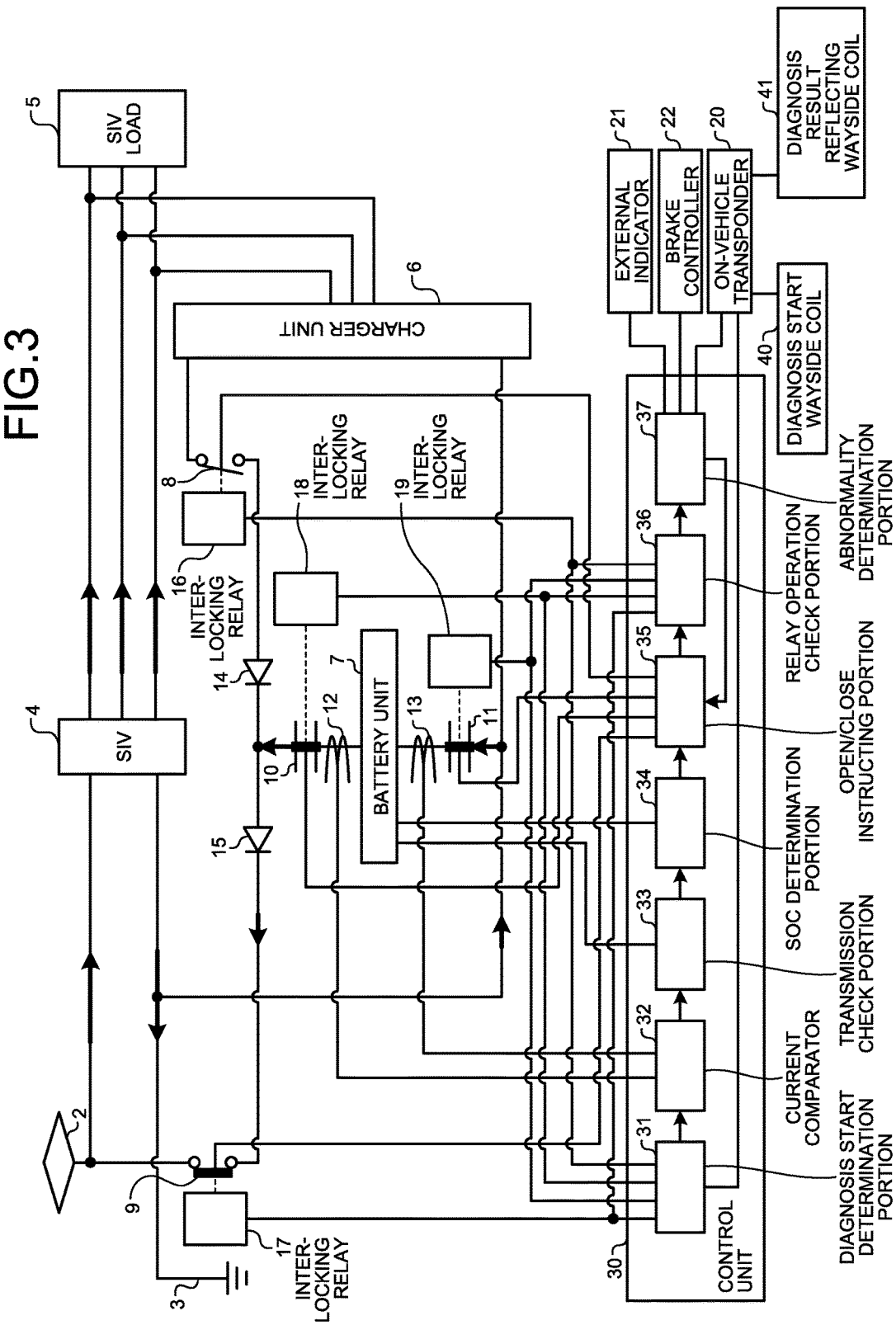
FIG. 3 is a diagram illustrating a circuit when the electric vehicle according to the first embodiment travels on a trolleyless section.

First, a configuration will be described with reference to FIGS. 1 to 3. FIG. 1 is a diagram schematically illustrating a vehicle system according to the first embodiment. FIG. 2 is a diagram illustrating a circuit when an electric vehicle according to the first embodiment travels on a trolley section. FIG. 3 is a diagram illustrating a circuit when the electric vehicle travels on a trolleyless section.

Referring to FIG. 1, the vehicle system according to the first embodiment is a vehicle system having an electric vehicle 100 (hereinafter, referred to as a vehicle) that travels on a trolley section by receiving electric power received from a trolley 1 and travels on a trolleyless section using electric power from a battery unit mounted on the vehicle 100. On the trolley section, when the vehicle 100 passes a diagnosis start wayside coil 40, a diagnosis circuit of the vehicle 100 starts a diagnosis for operability of a component necessary in a trolleyless section travel (trolleyless travel operability diagnosis start). Through this diagnosis, it is determined whether the component necessary in the trolleyless section travel is normal or abnormal. Then, when the vehicle 100 passes a diagnosis result reflecting wayside coil 41, the diagnosis circuit reflects the diagnosis result. If the diagnosis result is normal (upper half in FIG. 1), the vehicle 100 directly enters the trolleyless section and continuously travels. In contrast, when the diagnosis result is abnormal (lower half in FIG. 1), the diagnosis circuit stops the vehicle 100 before the vehicle 100 enters the trolleyless section. Note that the first embodiment is applicable to various vehicle systems such as a tramcar or a trolley bus other than the railway.

Referring to FIGS. 2 and 3, a main circuit of the vehicle 100 side includes a power collector 2 that collects electric power from the trolley 1, a ground portion 3 for grounding, a static inverter (SIV) 4 that converts the high-voltage DC power collected by the power collector 2 into a low-voltage three-phase AC power, a SIV load 5 such as a main controller or a light serving as a load of the converted AC power, an charger unit 6 for charging a battery unit 7 using the power from the SIV 4, a battery unit 7 provided with a battery and a battery management system (BMS) (not shown), a charging disconnector 8 for opening or closing a path from the positive side of the charger unit 6 to a positive side of the battery unit 7, a discharging disconnector 9 for opening or closing a path from the positive side of the battery unit 7 to the positive side input of the SIV 4, a positive-side contactor 10 installed between the charging and discharging disconnectors 8 and 9 and the positive side of the battery unit 7 to open or close the path therebetween, a negative-side contactor 11 installed between a negative side of the battery unit 7 and negative sides of the SIV 4 and the charger unit 6 to open or close the path therebetween, a positive-side current sensor 12 provided in the positive side of the battery unit 7, a negative-side current sensor 13 provided in the negative side of the battery unit 7, a charging backflow preventing diode 14 provided in a path between the charging disconnector 8 and the positive-side contactor 10, a discharge backflow preventing diode 15 provided in a path between the discharging disconnector 9 and the positive-side contactor 10, and a control unit 30 that controls open/close states of the charging disconnector 8, the discharging disconnector 9, the positive-side contactor 10, and the negative-side contactor 11. Note that, in FIGS. 2 and 3, the positive-side contactor 10 and the negative-side contactor 11 have an ON state (the same indications in other drawings similarly indicate the ON states).

The diagnosis circuit of the vehicle 100 includes interlocking relays 16 to 19 and the control unit 30 connected to the battery unit 7, the charging disconnector 8, the charging disconnector interlocking relay 16, the discharging disconnector 9, the discharging disconnector interlocking relay 17, the positive-side contactor 10, the positive-side contactor interlocking relay 18, the negative-side contactor 11, the negative-side contactor interlocking relay 19, the positive-side current sensor 12, the negative-side current sensor 13, an on-vehicle transponder 20, an external indicator 21, and a brake controller 22.

Note that the charging disconnector interlocking relay 16 interlocks with the charging disconnector 8, the discharging disconnector interlocking relay 17 interlocks with the discharging disconnector 9, the positive-side contactor interlocking relay 18 interlocks with the positive-side contactor 10, and the negative-side contactor interlocking relay 19 interlocks with the negative-side contactor 11, so that each of them can be opened or closed. One end of each of the interlocking relays 16 to 19 receives a constant voltage, and the other end is connected to the control unit 30. In the control unit 30, the following relay operation check portion 36 can check a voltage state (OFF/ON state) indicating the open/close state of each of the interlocking relays 16 to 19. As a result, the relay operation check portion 36 can check open/close states of the charging disconnector 8, the discharging disconnector 9, the positive-side contactor 10, and the negative-side contactor 11.

The control unit 30 as a part of the diagnosis circuit has a diagnosis start determination portion 31, a current comparator 32, a transmission check portion 33, a state-of-charge (SOC) determination portion 34, an open/close instructing portion 35, the relay operation check portion 36, and an abnormality determination portion 37 as diagnosis functions. These functions will be described below in more detail. Note that the control unit 30 has actual hardware such as a central processing unit (CPU), a non-volatile memory medium, and a main memory device for storing a control program. The control program has a modular configuration including each portion (such as the diagnosis start determination portion 31, the current comparator 32, the transmission check portion 33, the SOC determination portion 34, the open/close instructing portion 35, the relay operation check portion 36, and the abnormality determination portion 37). As the CPU reads the control program from the memory medium and loads it on the main memory device, the diagnosis start determination portion 31, the current comparator 32, the transmission check portion 33, the SOC determination portion 34, the open/close instructing portion 35, the relay operation check portion 36, and the abnormality determination portion 37 are generated on the main memory device.

The vehicle 100 has an on-vehicle transponder 20 as on-vehicle communication equipment, an external indicator 21 as a device for indicating a diagnosis result of the diagnosis circuit, and the brake controller 22 for stopping the vehicle 100 under control of the diagnosis circuit.

The vehicle system according to the first embodiment has a diagnosis start wayside coil 40 and a diagnosis result reflecting wayside coil 41 as on-ground communication equipment for communication with the on-vehicle transponder 20.

Next, operations of the vehicle system according to the first embodiment will be described with reference to FIGS. 2 to 17. Note that, in each block diagram, a bold arrow on the connection line indicates an electric current (power) flow, and a bold arrow from one element to another element indicates a signal or information flow.

First, the operations of the main circuit in a trolley section travel and in a trolleyless section travel will be described.

(Trolley Section Travel: FIG. 2)

During a trolley section travel (in this case, the battery unit 7 has a charging state), the vehicle 100 obtains electric power from the trolley 1 through the power collector 2 and converts the obtained high-voltage DC power into the low-voltage AC power through the SIV 4. A part of the low-voltage AC power from the SIV 4 is consumed in the SIV load 5, and the remaining AC power is supplied to the charger unit 6. The power supplied to the charger unit 6 is supplied to the battery unit 7 through the charging disconnector 8 having an ON state, the charging backflow preventing diode 14, the positive-side contactor 10 having an ON state, and the negative-side contactor 11 to charge the battery unit 7. In this case, the positive-side current sensor 12 and the negative-side current sensor 13 detect the currents of the positive and negative sides, respectively, of the battery unit 7.

(Trolleyless Section Travel: FIG. 3)

During a trolleyless section travel (in this case, the battery unit 7 has a discharge state), the vehicle 100 performs discharge from the battery unit 7 and supplies the power consumed in the SIV load 5. In this case, the DC power discharged from the battery unit 7 is supplied to the SIV 4 through the positive-side contactor 10 having an ON state, the discharge backflow preventing diode 15, the discharging disconnector 9 having an ON state, and the negative-side contactor 11 having an ON state, and the SIV 4 converts the DC power into the AC power, which is consumed in the SIV load 5.

Figure 4:
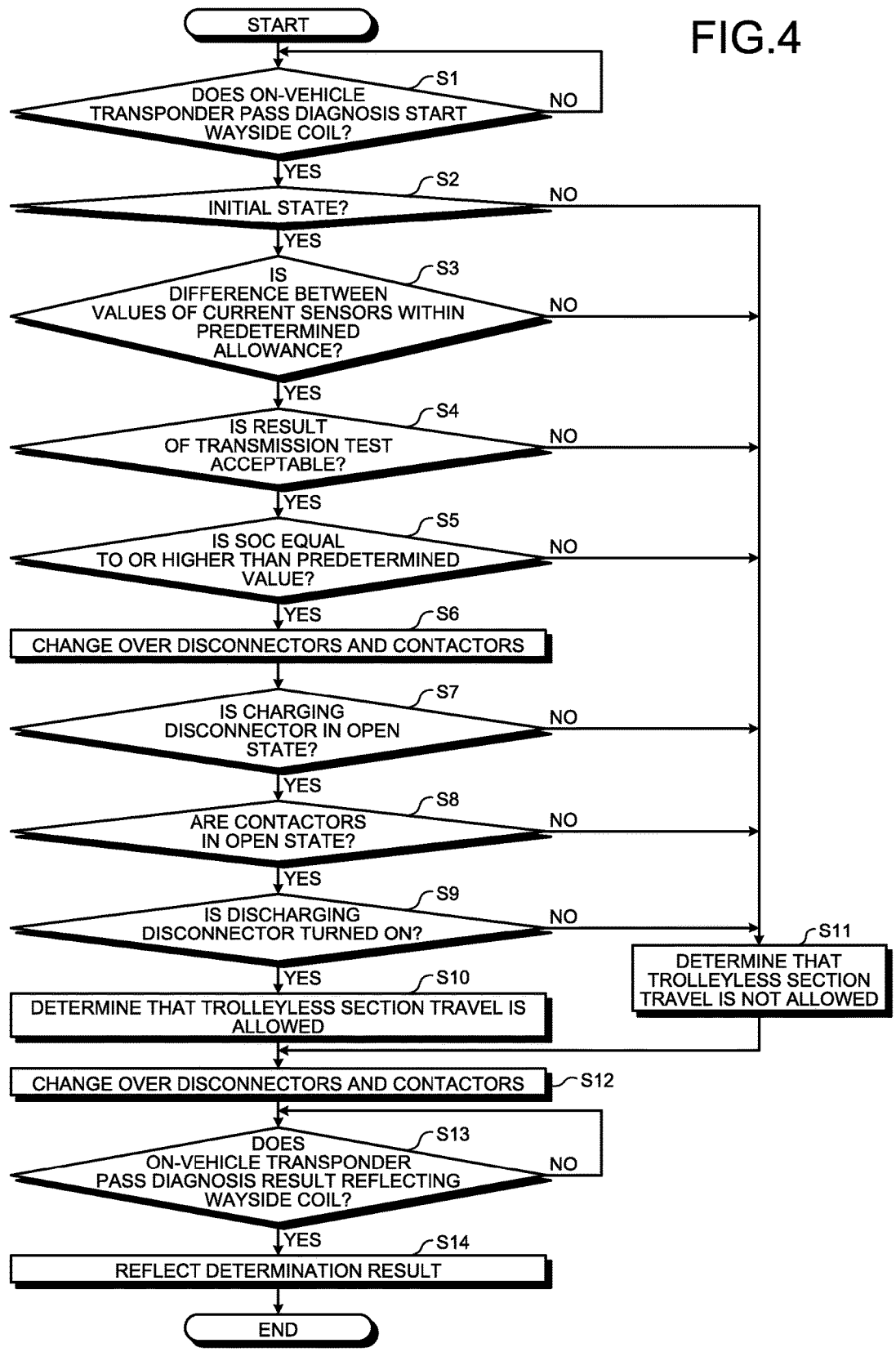
FIG. 4 is an operational flowchart illustrating operations of a diagnosis circuit of the vehicle system according to the first embodiment.
Figure 5:
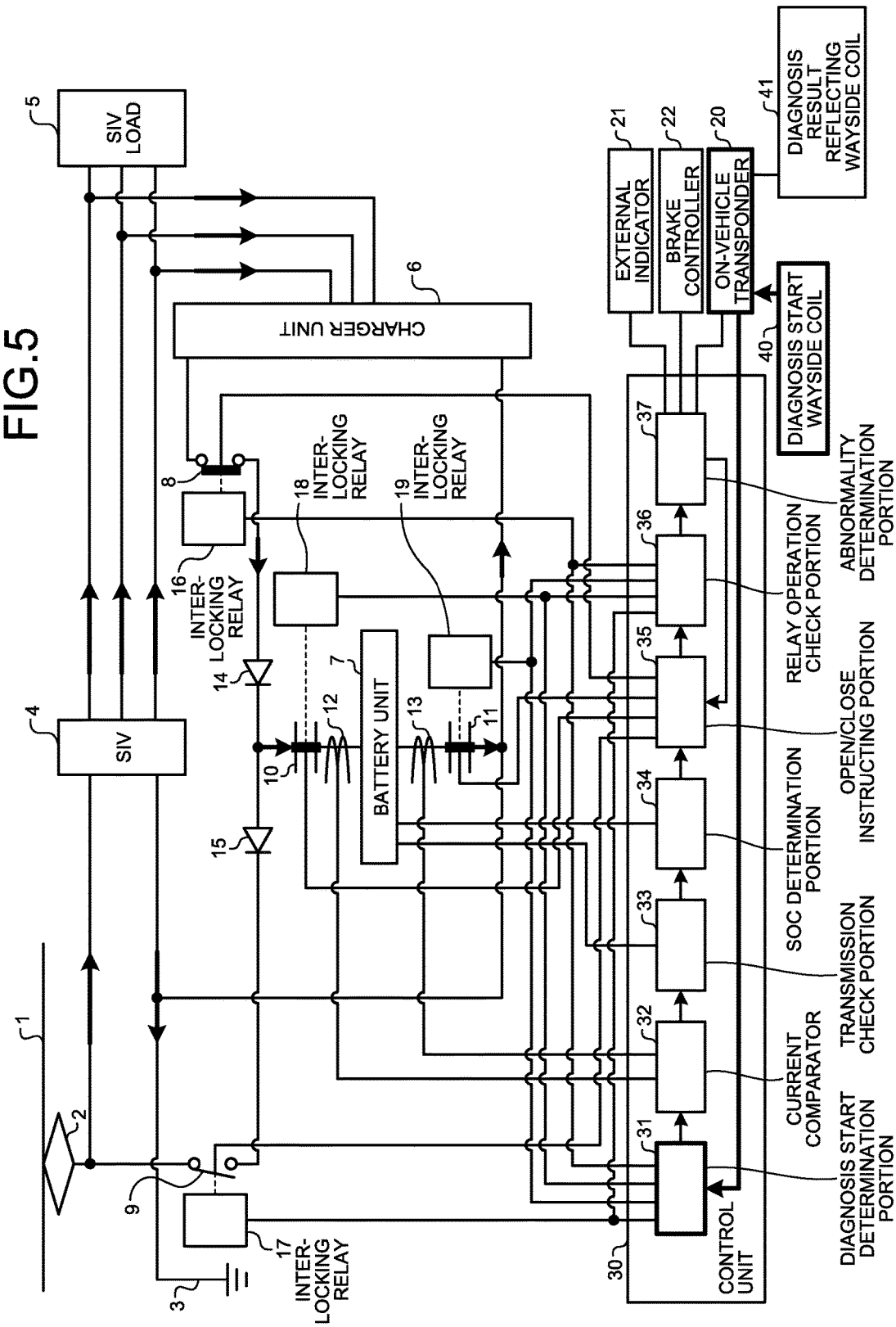
FIG. 5 is a diagram illustrating a circuit operation on the operational flowchart of FIG. 4.
Figure 6:
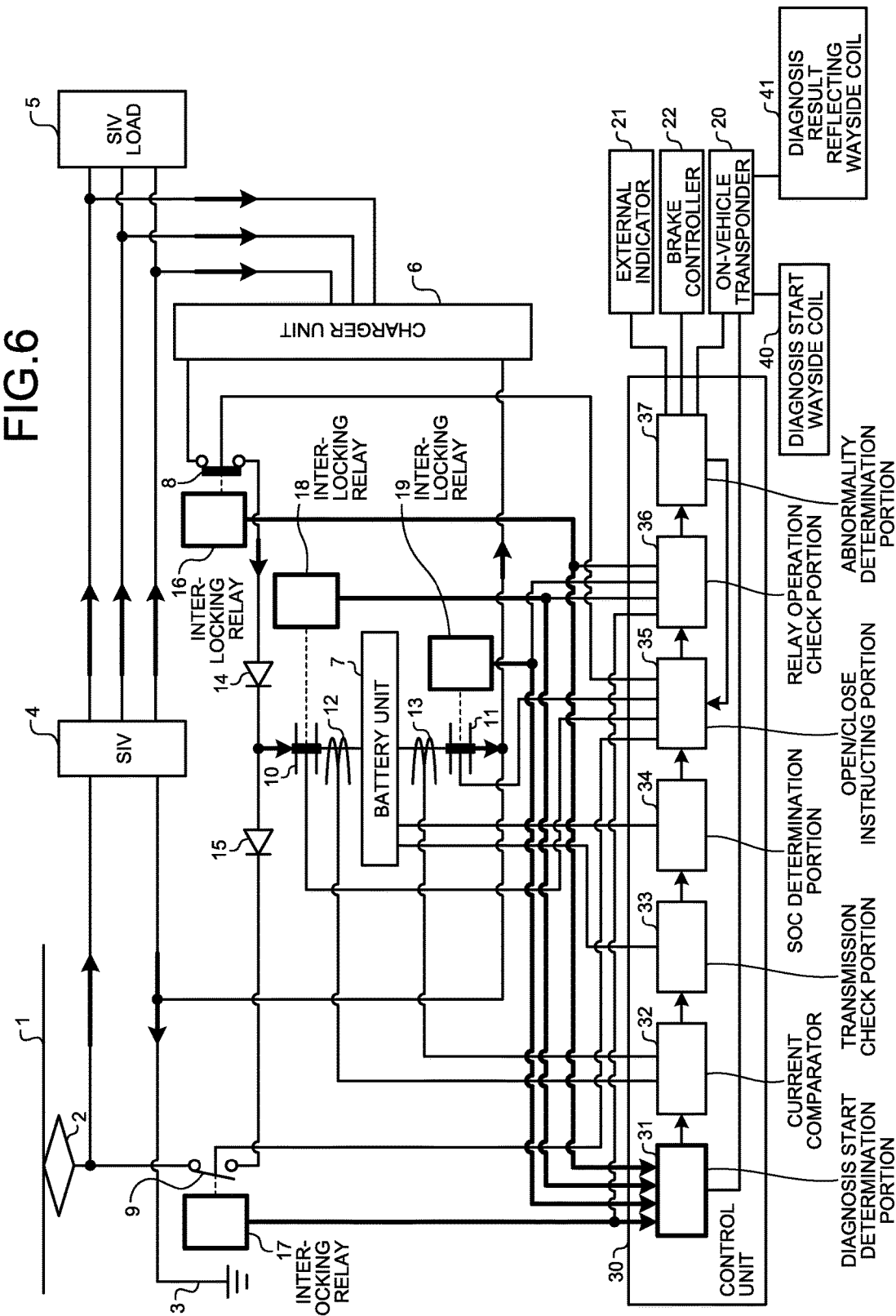
FIG. 6 is a diagram illustrating a circuit operation on the operational flowchart of FIG. 4.

Next, the operation of the diagnosis circuit of the vehicle system according to the first embodiment shown in the flowchart of FIG. 4 will be described along with the operation of the main circuit.

Here, it is assumed that the vehicle 100 initially travels on the trolley section (in this case, the state of FIG. 2).

While the vehicle 100 travels on the trolley section, the diagnosis start determination portion 31 has a standby state until the on-vehicle transponder 20 passes the diagnosis start wayside coil 40 (No in S1, and the process returns to S1). Then, when it is detected that the on-vehicle transponder 20 passes the diagnosis start wayside coil 40 in response to a notification from the on-vehicle transponder 20 (Yes in S1, FIG. 5), it is checked whether or not the open/close states of the respective interlocking relays 16 to 19 of the charging disconnector 8, the discharging disconnector 9, the positive-side contactor 10, and the negative-side contactor 11 are set to the charging states as their initial states (all of them are set to ON states except for the discharging disconnector 9) (S2 in FIG. 6).

Figure 7:
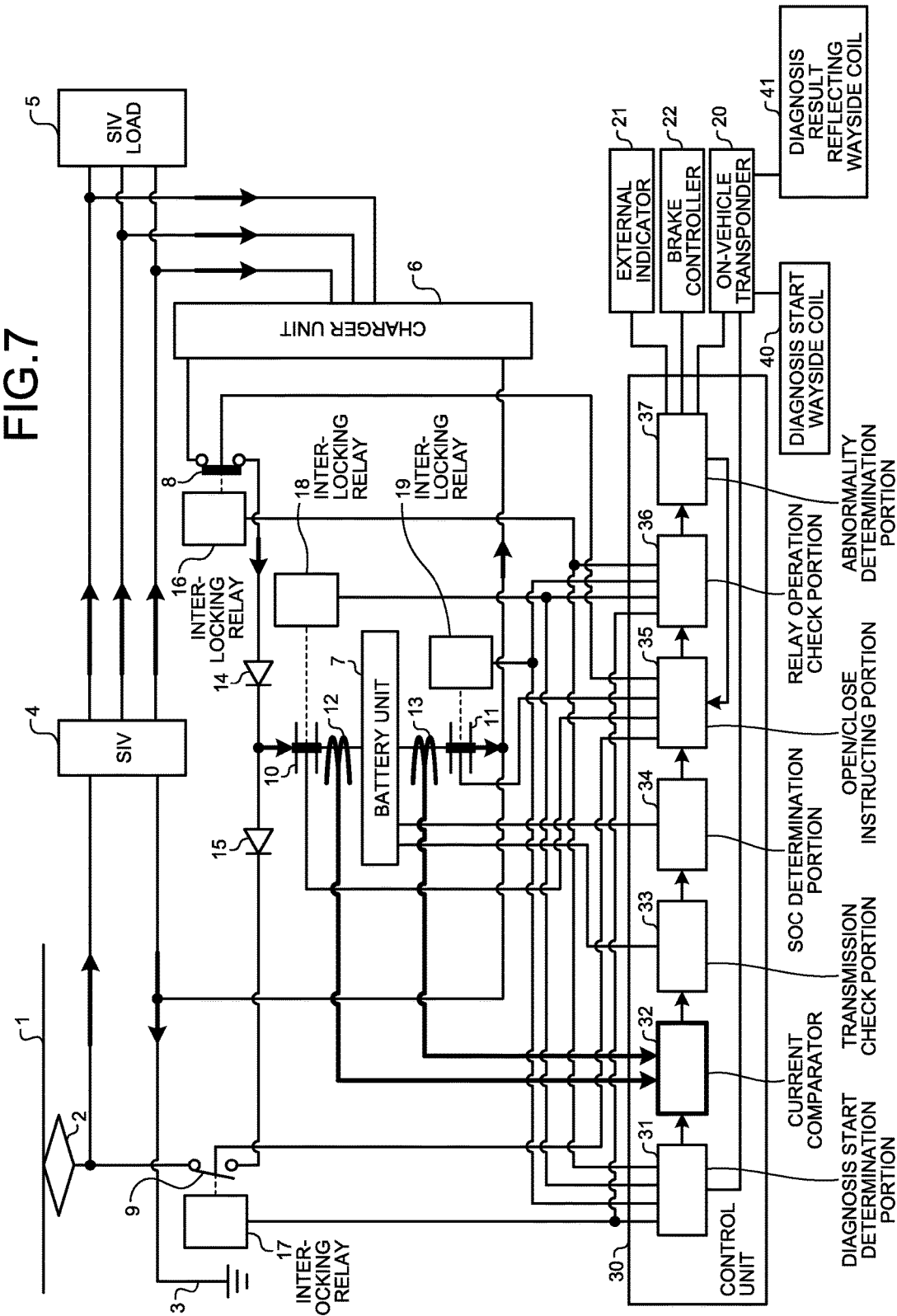
FIG. 7 is a diagram illustrating a circuit operation on the operational flowchart of FIG. 4.

In this case, if it is checked that they are set to the charging states (Yes in S2), the current comparator 32 compares a difference between the current values detected by the positive-side current sensor 12 and the negative-side current sensor 13 with a predetermined allowance to check operabilities of the sensors 12 and 13 (S3 in FIG. 7). Here, if the difference of the current value is within the predetermined allowance, the current comparator 32 determines that both the positive-side and negative-side current sensors 12 and 13 are operable (normal). Otherwise, the current comparator 32 determines they are abnormal.

Figure 8:
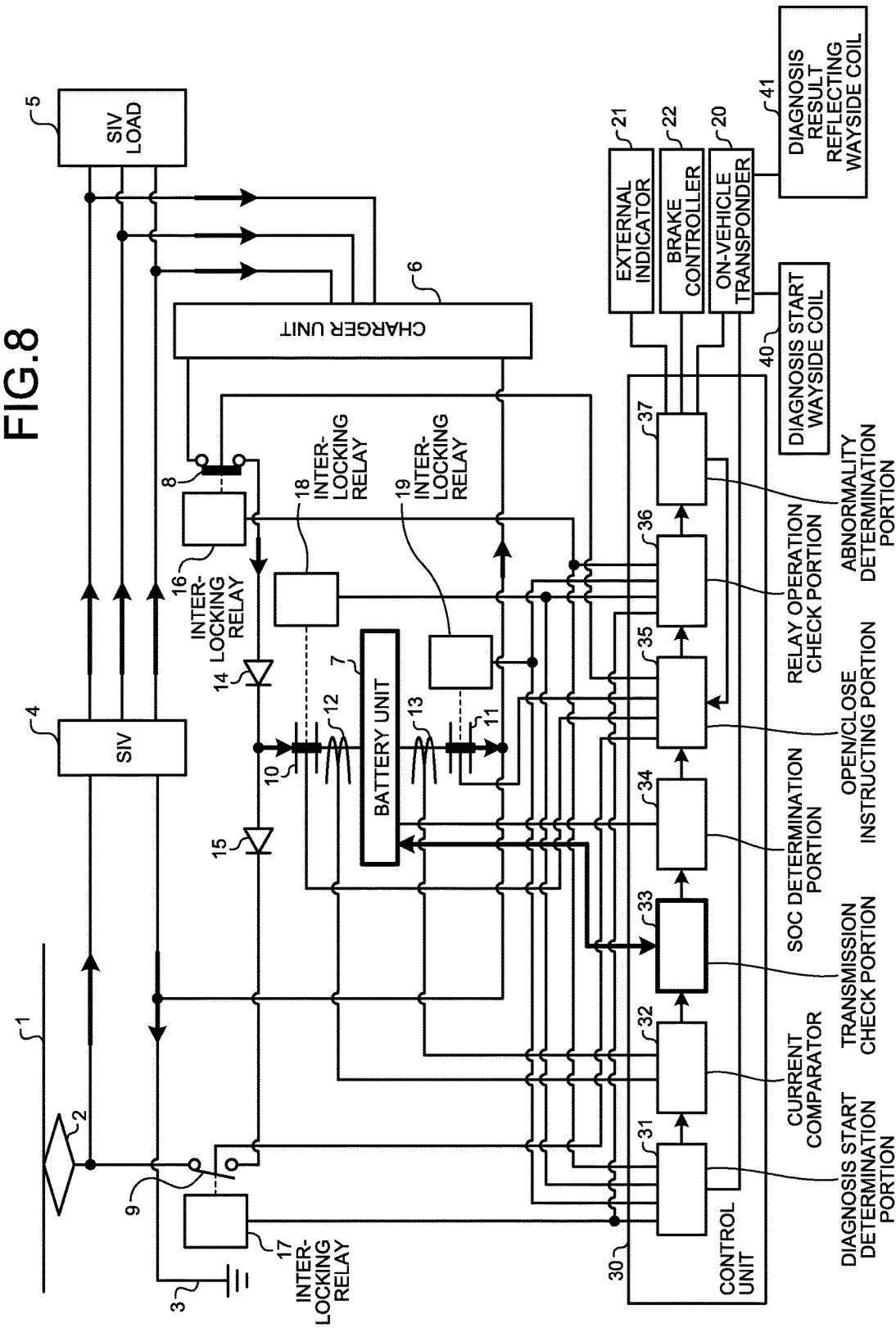
FIG. 8 is a diagram illustrating a circuit operation on the operational flowchart of FIG. 4.

If it is checked that each of the current sensors 12 and 13 is operable (Yes in S3), the transmission check portion 33 transmits a test signal to the battery unit 7 to check whether or not a response is normally returned from the battery unit 7 (S4 in FIG. 8). Here, if there is a normal response from the battery unit 7, the transmission check portion 33 determines that the battery unit 7 is operable. Otherwise, the transmission check portion 33 determines that the battery unit 7 is abnormal.

Figure 9:
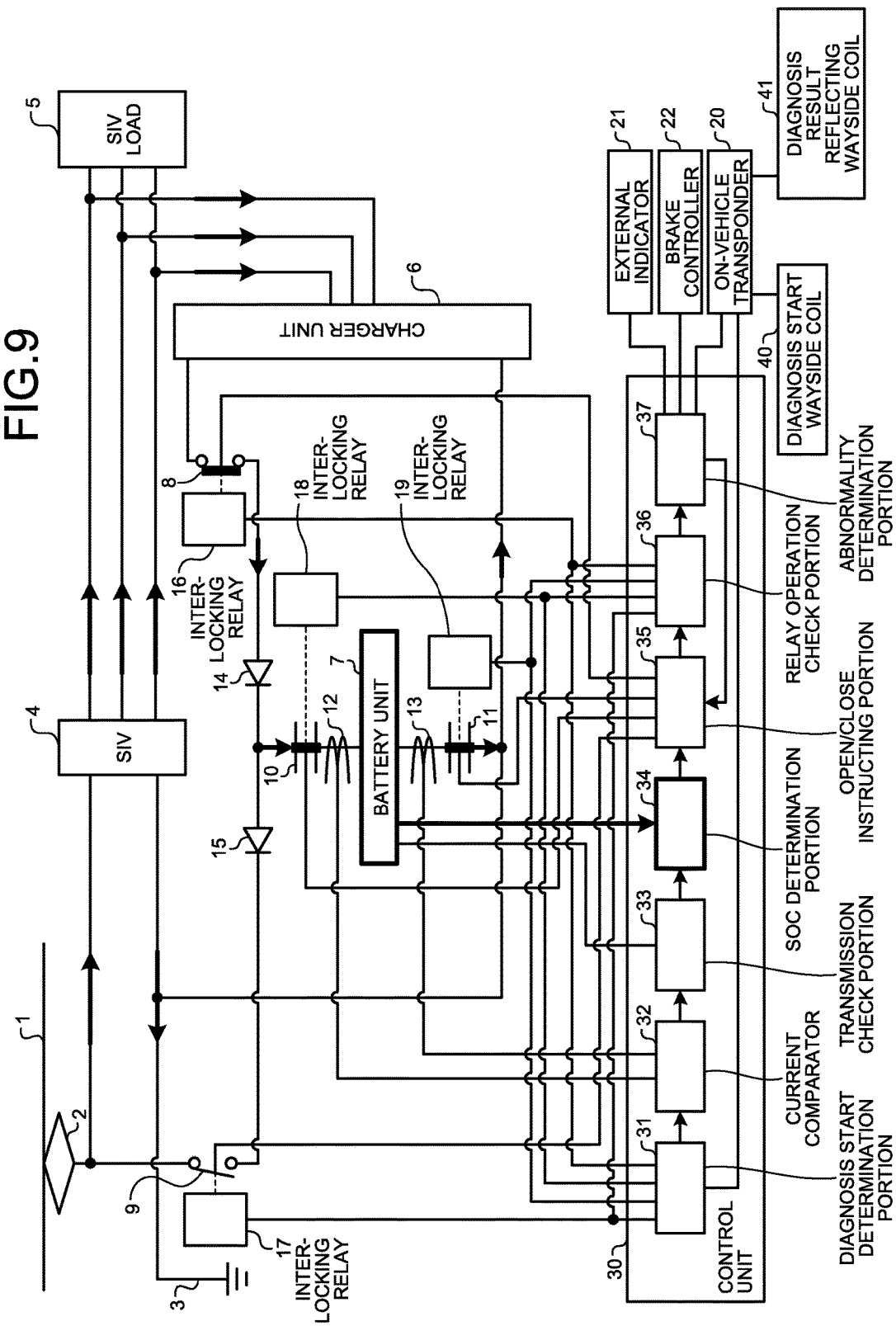
FIG. 9 is a diagram illustrating a circuit operation on the operational flowchart of FIG. 4.

If the operability of the battery unit 7 is checked (Yes in S4), the SOC determination portion 34 measures the SOC of the battery unit 7 to determine whether or not the SOC of the battery unit 7 is equal to or higher than a predetermined SOC level necessary in the trolleyless section travel (S5). In this case, the SOC determination portion 34 measures the SOC of the battery unit 7 by estimating the SOC from the charging/discharging current values detected by the positive-side and negative-side current sensors 12 and 13 and obtained by the control unit 30 using a method known in the art such as a current integration method. Alternatively, the battery unit 7 of itself may measure the SOC and allow the SOC determination portion 34 to obtain the measurement result (FIG. 9). According to this embodiment, the battery capacity of the battery unit 7 mounted on the vehicle 100 is known in advance. Therefore, the SOC is employed as a physical amount for indicating a remaining battery capacity of the battery unit 7. That is, according to the first embodiment, the SOC determination portion 34 determines whether the current SOC is equal to or higher than a predetermined SOC, so that it is checked whether or not a remaining battery capacity necessary for the vehicle 100 to make a trolleyless section travel is stored in the battery unit 7.

Figure 10:
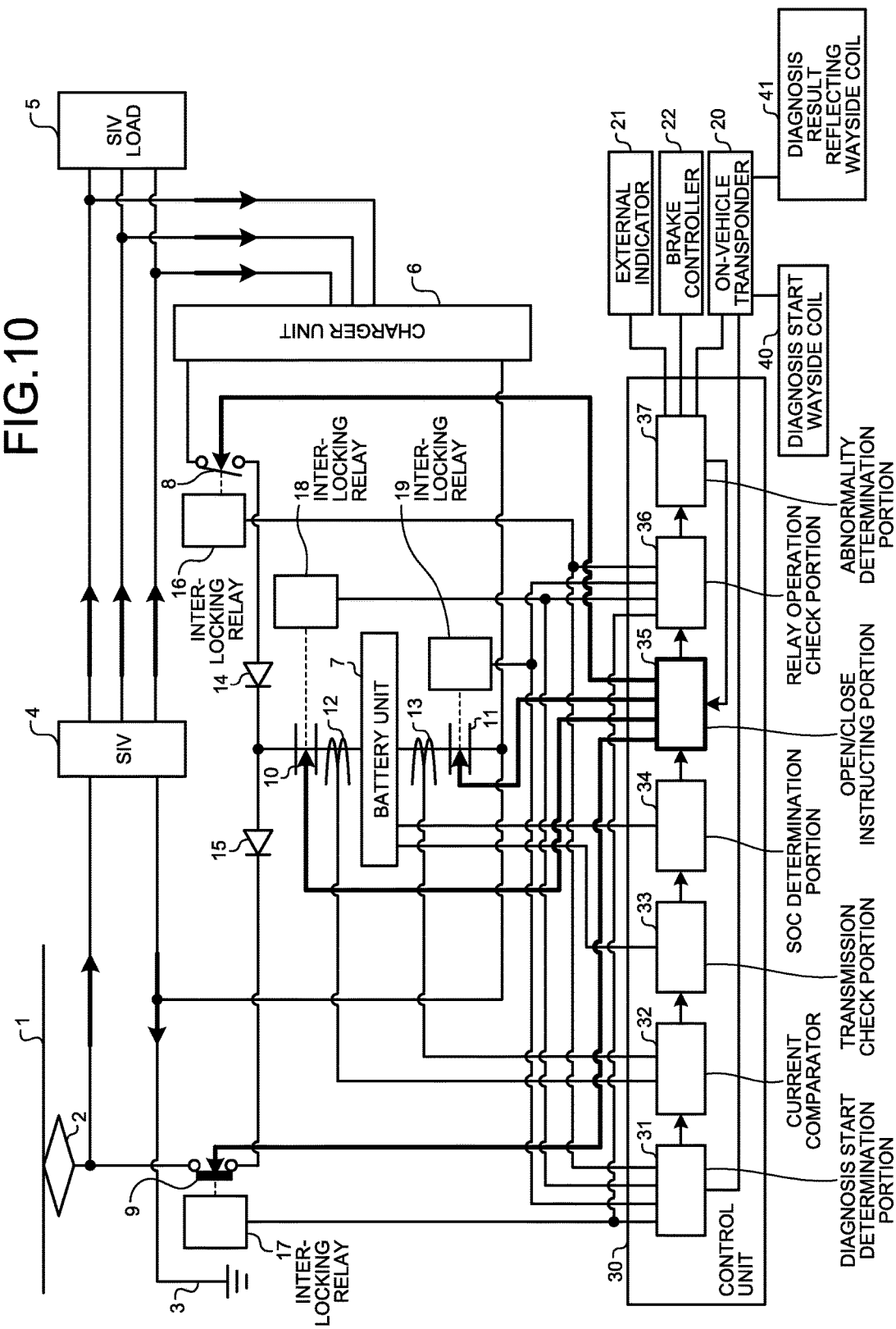
FIG. 10 is a diagram illustrating a circuit operation on the operational flowchart of FIG. 4.
Figure 11:
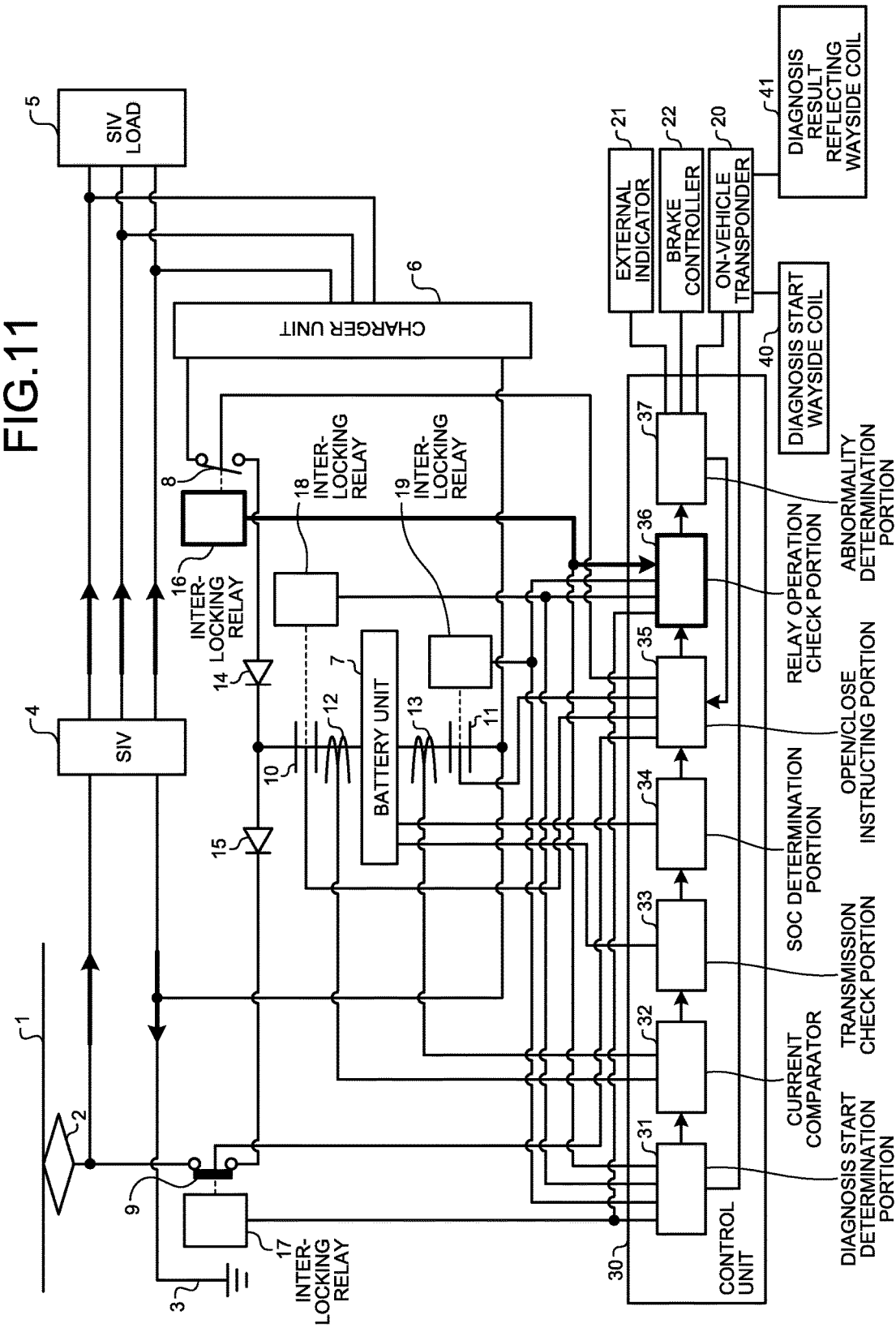
FIG. 11 is a diagram illustrating a circuit operation on the operational flowchart of FIG. 4.
Figure 12:
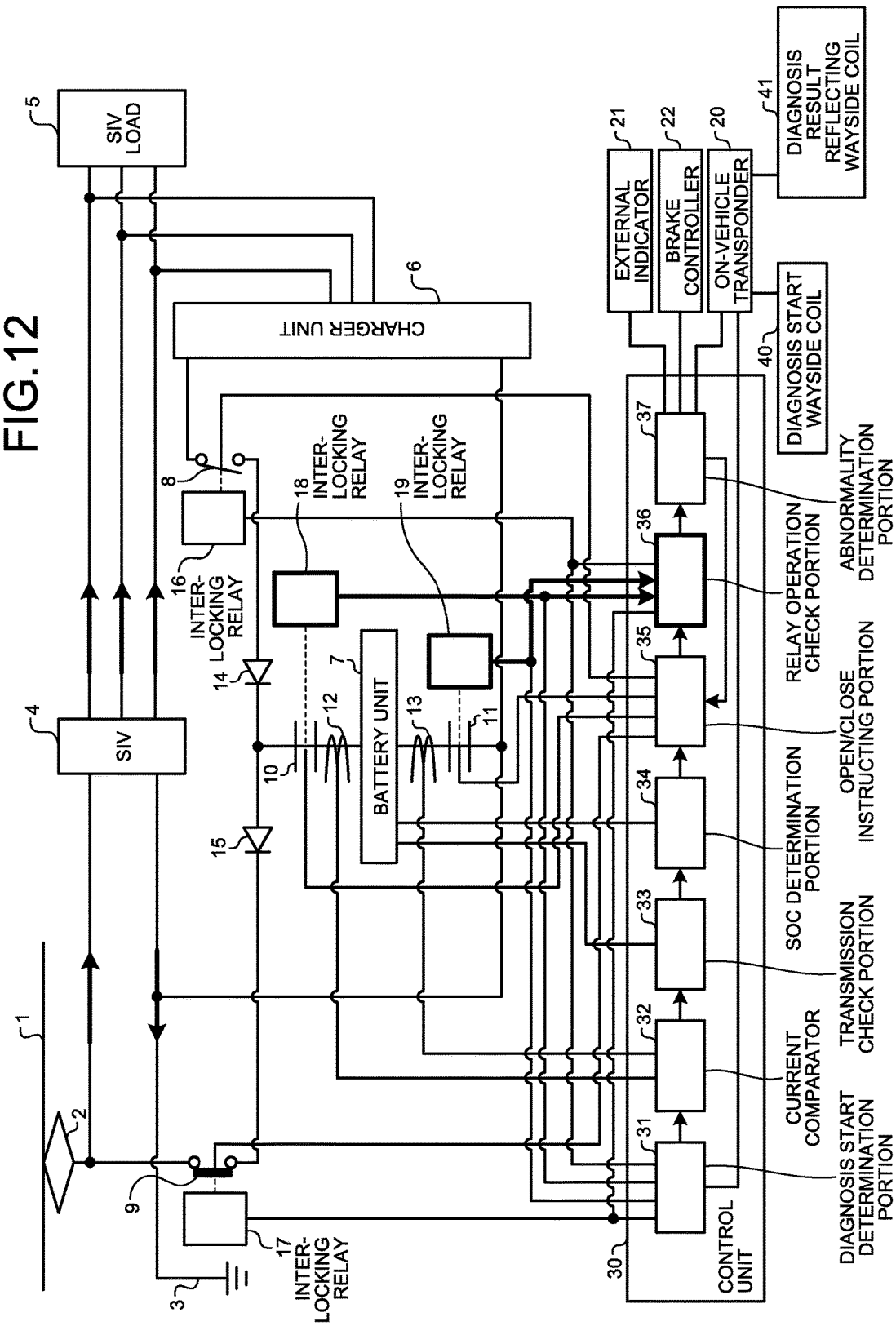
FIG. 12 is a diagram illustrating a circuit operation on the operational flowchart of FIG. 4.

If the SOC determination portion 34 determines that the SOC of the battery unit 7 is equal to or higher than the predetermined SOC necessary to make a trolleyless section travel (Yes in S5), the open/close instructing portion 35 issues open/close instructions in the following sequence in order not to flow the current from the charger unit 6 to the SIV 4 to change over each of the disconnectors and the contactors 8 to 11 (S6 in FIG. 10). The changeover sequence is set to (1) open the charging disconnector 8, (2) open the positive-side and negative-side contactors 10 and 11, and (3) turn on the discharging disconnector 9. As a result, neither the charging nor discharging of the battery unit 7 occurs. Note that, in FIG. 10, the positive-side contactor 10 and the negative-side contactor 11 have the open states (in other drawings, the same indications similarly refer to the ON states).

Figure 13:
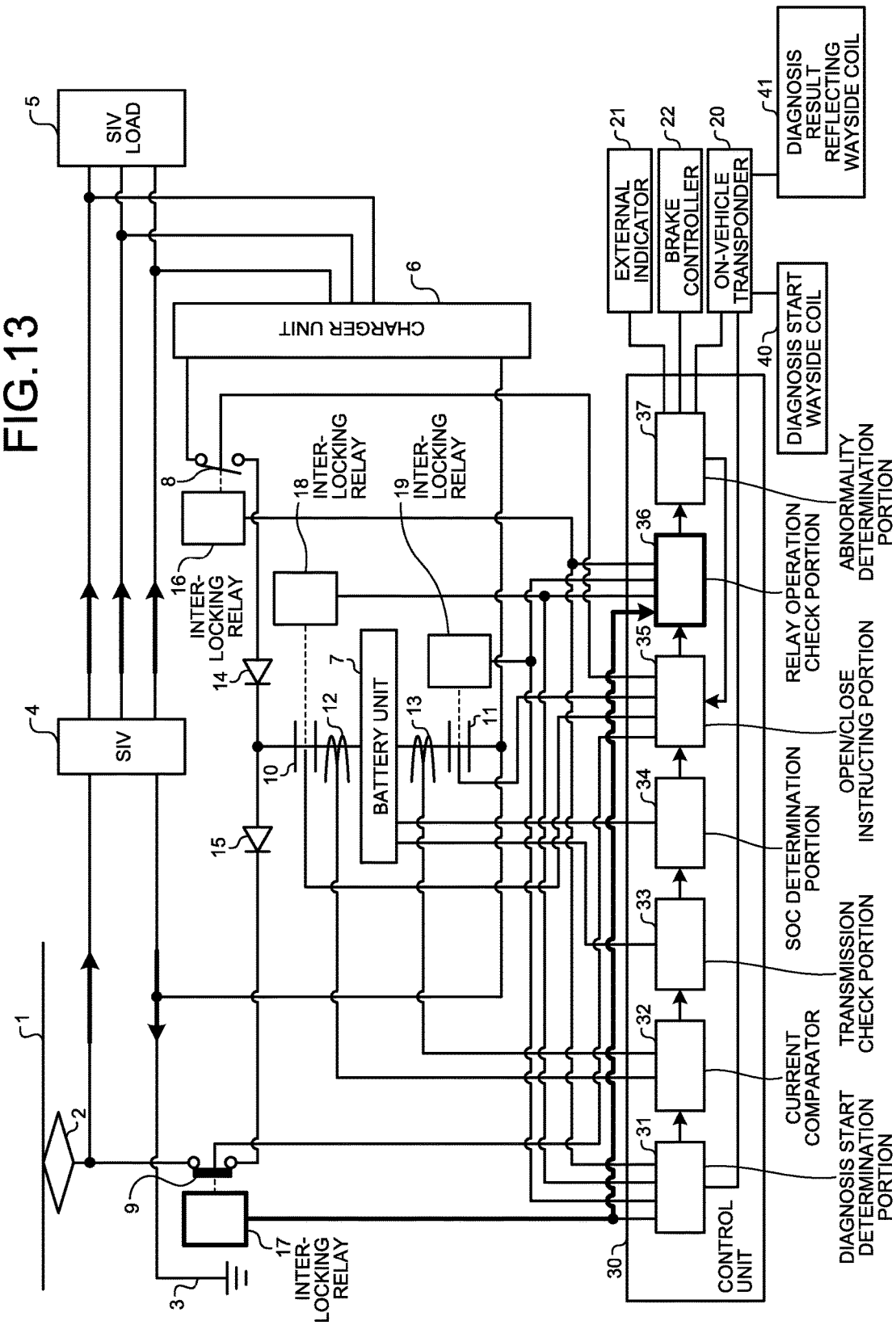
FIG. 13 is a diagram illustrating a circuit operation on the operational flowchart of FIG. 4.
Figure 14:
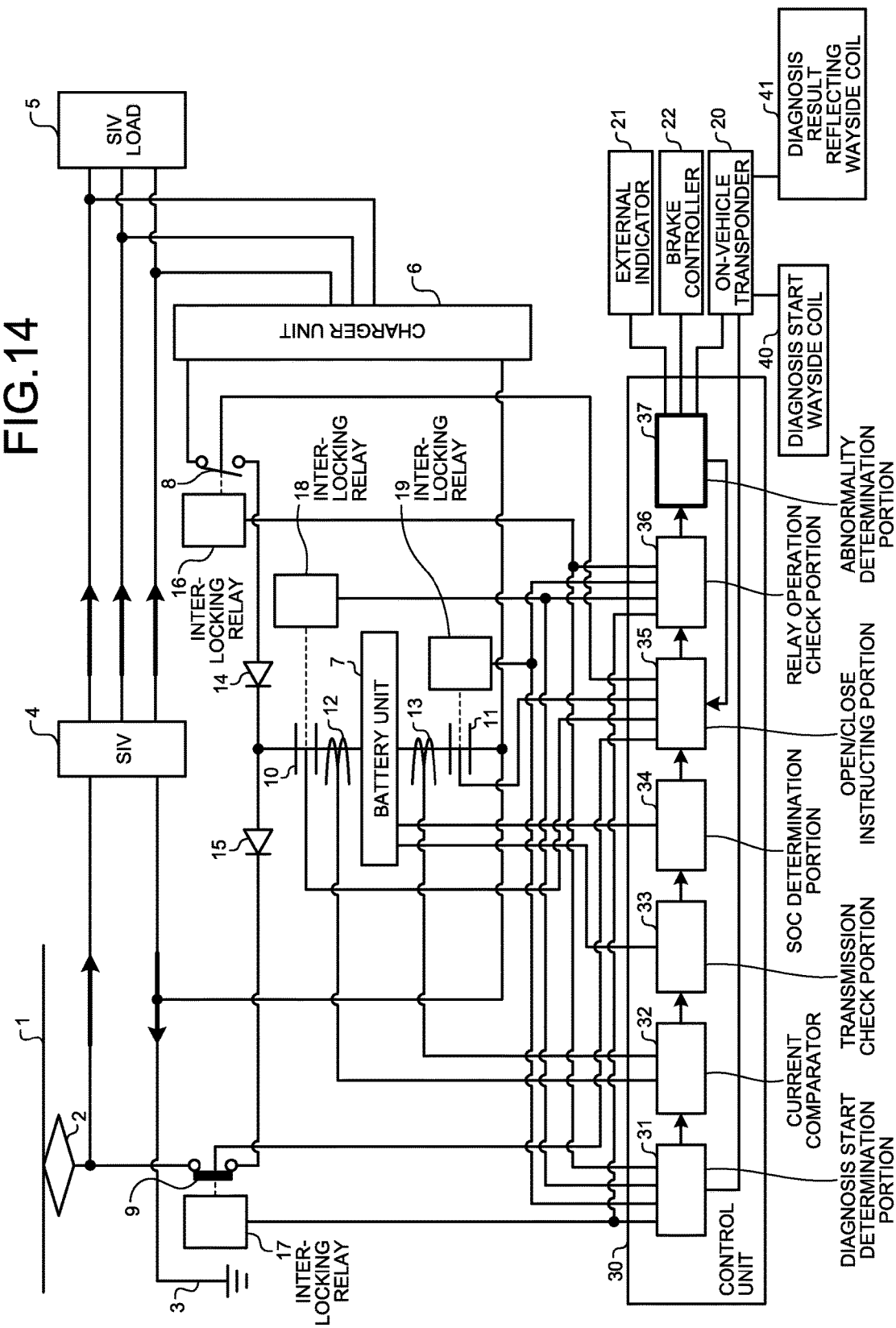
FIG. 14 is a diagram illustrating a circuit operation on the operational flowchart of FIG. 4.

Then, the relay operation check portion 36 checks whether or not the charging disconnector interlocking relay 16 is turned off (S7 in FIG. 11), whether or not the positive-side contactor interlocking relay 18 that interlocks with the positive-side contactor 10 and the negative-side contactor interlocking relay 19 that interlocks with the negative-side contactor 11 are turned off (S8 in FIG. 12), and whether or not the discharging disconnector interlocking relay 17 is turned on (S9 in FIG. 13). If all of the conditions are satisfied (Yes in S7 to S9), that is, if the changeover is performed normally, the process advances to S10. Note that, if No is determined in any one of S2 to S5 and S7 to S9, the process advances to S11.

The abnormality determination portion 37 determines that "the trolleyless section travel is allowed (S10)" or "the trolleyless section travel is not allowed (S11)" on the basis of the diagnosis results of the diagnosis items S2 to S5 and S7 to S9 described above (FIG. 14). Note that, as illustrated in FIG. 4, the trolleyless section travel is allowed only when all of the diagnosis items are satisfied. Otherwise, the trolleyless section travel is not allowed.

Figure 15:
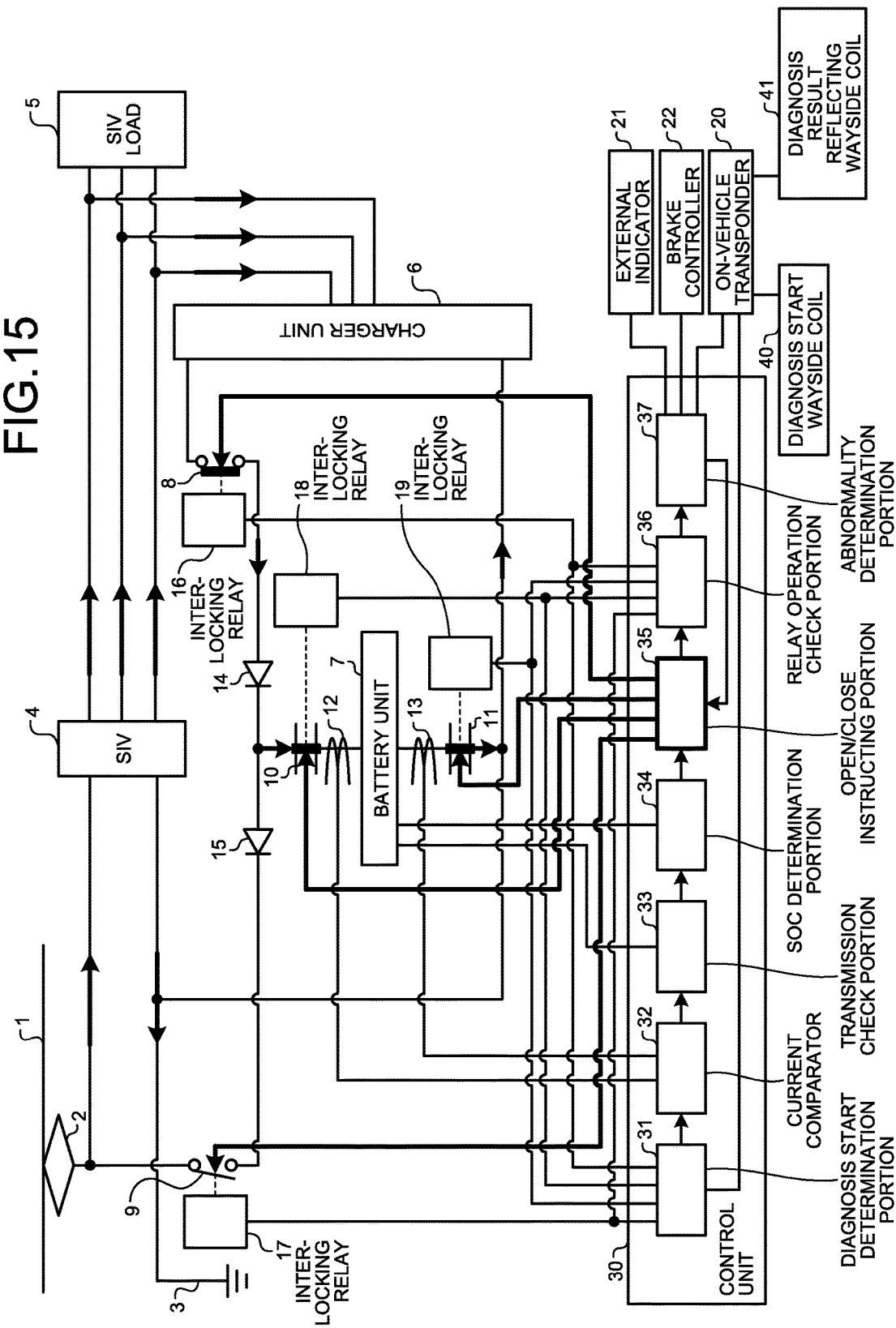
FIG. 15 is a diagram illustrating a circuit operation on the operational flowchart of FIG. 4.
Figure 16:
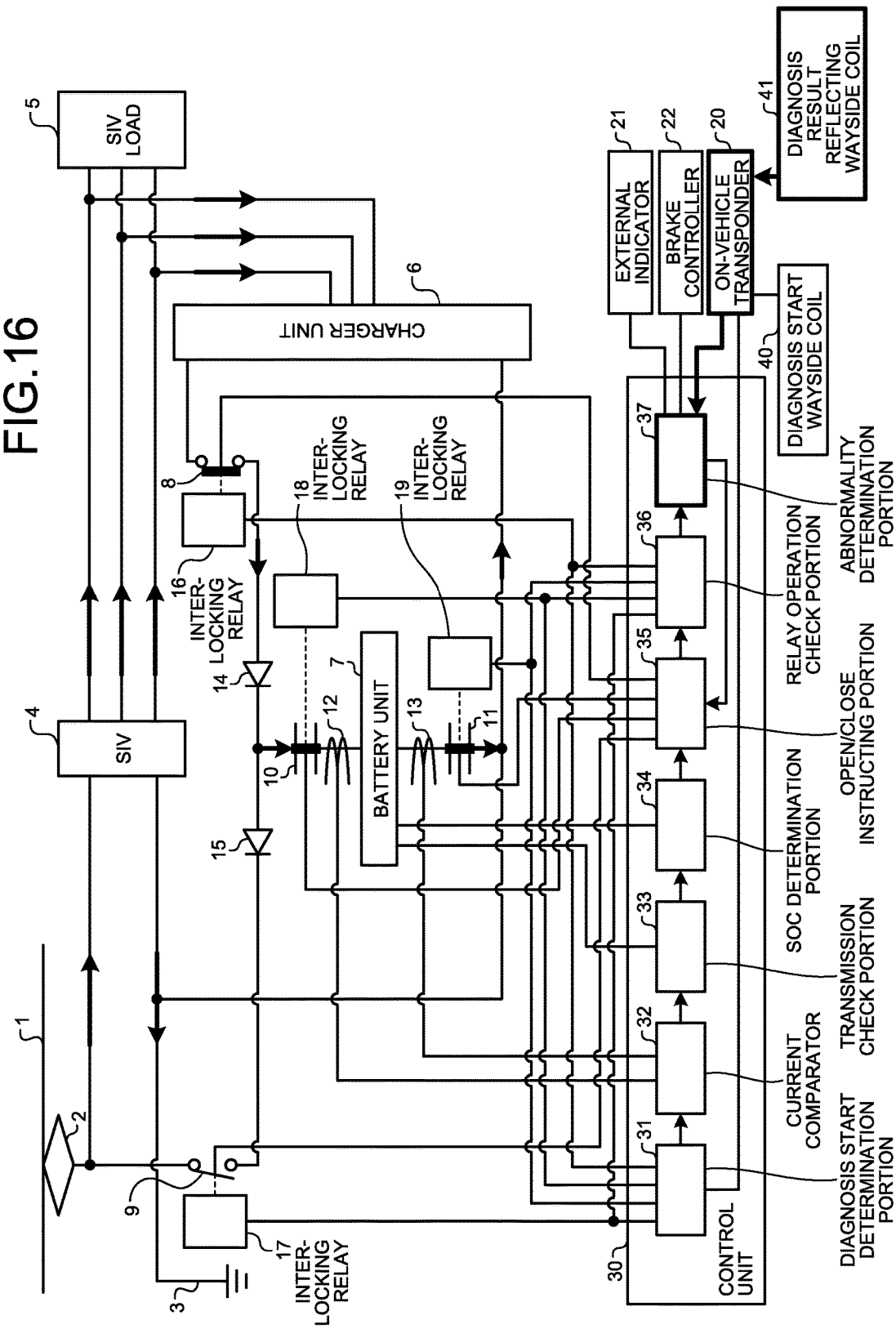
FIG. 16 is a diagram illustrating a circuit operation on the operational flowchart of FIG. 4.

Then, the open/close instructing portion 35 issues open/close instructions in the following sequence in order not to flow an electric current from the charger unit 6 and the battery unit 7 to the SIV 4 side and changes over each of the disconnectors and the contactors 8 to 11 (S12 in FIG. 15). In this case, the changeover sequence is set to (1) open the discharging disconnector 9, (2) turn on the positive-side contactor 10 and the negative-side contactor 11, and (3) turn on the charging disconnector 8. As a result, the battery unit 7 has a charging state of the normal operation.

Then, if the on-vehicle transponder 20 receives a signal from the diagnosis result reflecting wayside coil 41 provided in front of the trolleyless section (Yes in S13 of FIG. 16), the diagnosis result (S10 and S11) described above is reflected by the abnormality determination portion 37 (S14). That is, when the diagnosis result indicates that "the trolleyless section travel is not allowed" (S11), a signal for indicating an alarm on the external indicator 21 is output from the abnormality determination portion 37, and an emergency braking instruction is output to the brake controller 22, so that the vehicle 100 stops in the middle of the trolley section (FIG. 17). Meanwhile, when the diagnosis result indicates that "the trolleyless section travel is allowed" (S10), the abnormality determination portion 37 does not output a signal to the external indicator 21 or an emergency braking instruction to the brake controller 22 unlike the case where "the trolleyless section travel is not allowed." Instead, the vehicle 100 enters the trolleyless section and continuously performs driving (S14). Note that the diagnosis result reflecting wayside coil 41 is provided in a position where the vehicle 100 can stop before entering the trolleyless section. In addition, until the on-vehicle transponder 20 receives a signal from the diagnosis result reflecting wayside coil 41, No is determined in S13, and the vehicle 100 has a signal waiting state for receiving a signal from the diagnosis result reflecting wayside coil 41. During that time, the vehicle 100 continuously travels normally on the trolley section.

Using the vehicle system according to the first embodiment described above, operability of the component used in a trolleyless section travel can be diagnosed during the trolley section travel. Therefore, it is possible to notice a failure of a component used for the first time in a trolleyless section travel after entering the trolleyless section and avoid a possible significant delay in a schedule diagram that may be generated when the vehicle 100 is stuck.

Second Embodiment

Figure 18A:
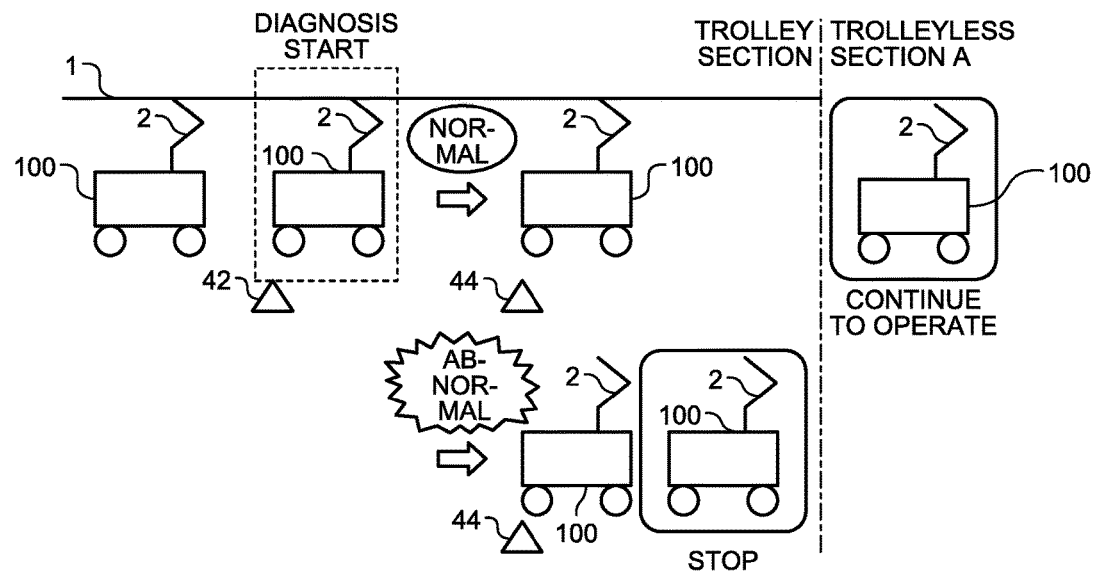
FIG. 18A is a diagram schematically illustrating a vehicle system according to a second embodiment.
Figure 18B:
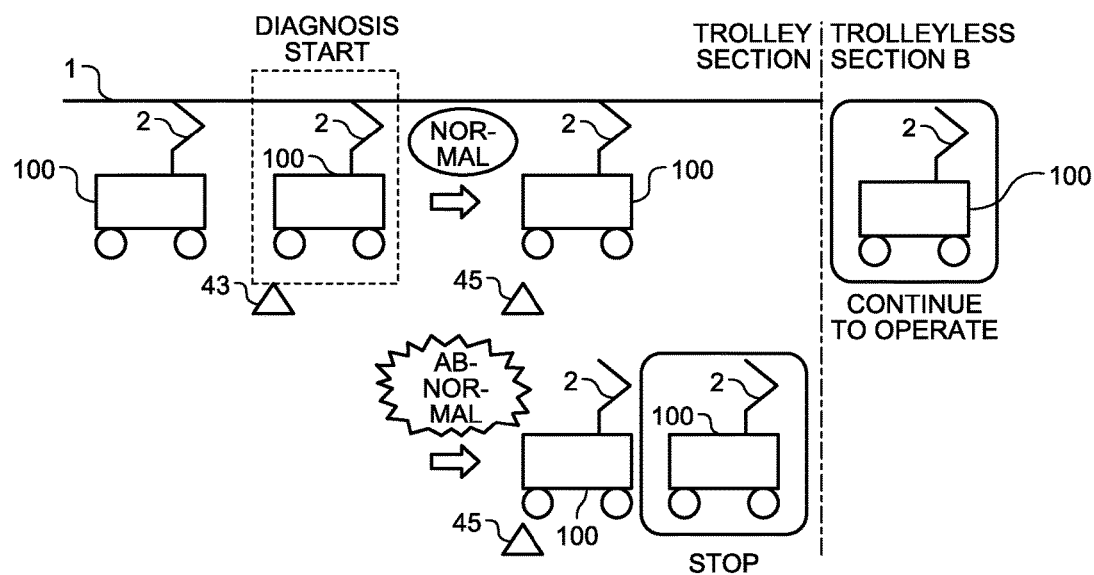
FIG. 18B is a diagram schematically illustrating the vehicle system according to the second embodiment.
Figure 19:
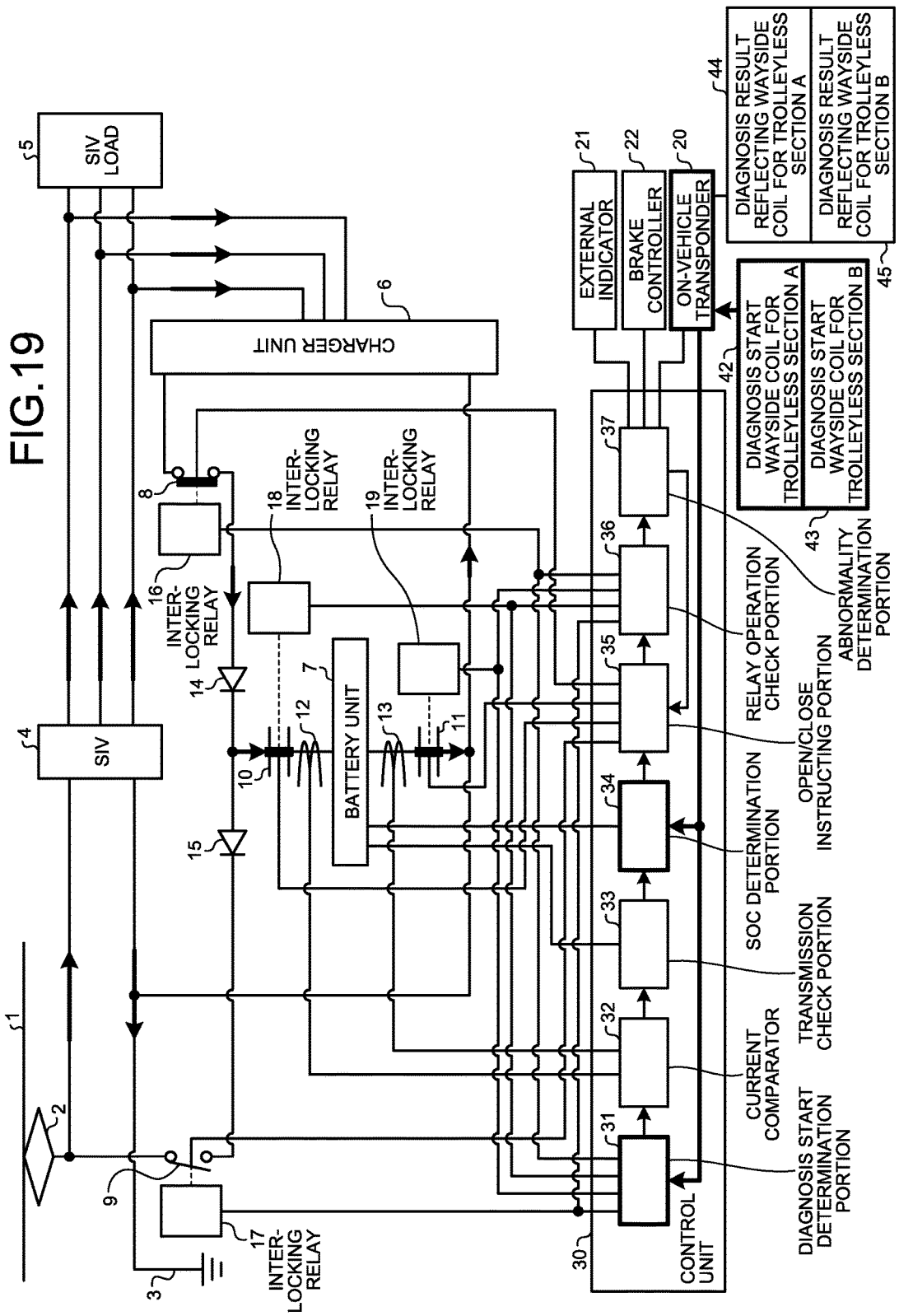
FIG. 19 is a diagram illustrating a circuit operation unique to the second embodiment.

Next, a second embodiment will be described in detail with reference to FIGS. 18A, 18B, and 19. FIGS. 18A and 18B are diagrams schematically illustrating a vehicle system according to the second embodiment. FIG. 19 is a diagram illustrating a circuit operation unique to the second embodiment. Note that like reference numerals denote like elements throughout FIGS. 1 to 17, and they will not be described repeatedly.

The second embodiment is different from the first embodiment in that a plurality of trolleyless sections having different interval lengths (for example, the trolleyless section A of FIG. 18A and the trolleyless section B of FIG. 18B) are provided. Naturally, the number of trolleyless sections having different interval lengths is not limited to two illustrated in the drawings. Differences from the first embodiment will now be described.

According to the second embodiment, a travel route of the vehicle 100 has a plurality of trolleyless sections having different interval lengths as described above. For this reason, according to the second embodiment, as illustrated in FIGS. 18A and 18B, for the trolleyless sections A and B having different interval lengths, a diagnosis start wayside coil 42 for the trolleyless section A, a diagnosis result reflecting wayside coil 44 for the trolleyless section A, a diagnosis start wayside coil 43 for the trolleyless section B, and a diagnosis result reflecting wayside coil 45 for the trolleyless section B are provided. In addition, the signals output from the diagnosis start wayside coil 42 for the trolleyless section A and the diagnosis start wayside coil 43 for the trolleyless section B to the on-vehicle transponder 20 are set to identify each of the diagnosis start wayside coils 42 and 43. Furthermore, the control unit 30 has SOC data (SOC reference values) serving as a reference for the SOC determination portion 34 to perform determination for each trolleyless section, for example, in the format of a table.

According to the second embodiment, the on-vehicle transponder 20 notifies the SOC determination portion 34 of which trolleyless section is scheduled to be occupied and provides a notification of the diagnosis start to the diagnosis start determination portion 31 as well on the basis of the signals from the diagnosis start wayside coil 42 for the trolleyless section A and the diagnosis start wayside coil 43 for the trolleyless section B (FIG. 19).

The SOC determination portion 34 determines the SOC with respect to the SOC by which the vehicle 100 can travel on a trolleyless section scheduled to be occupied in the next operation on the basis of information from the on-vehicle transponder 20.

Other operations are similar to those of the first embodiment.

Using the vehicle system according to the second embodiment described above, it is possible to diagnose operability of a component used in a trolleyless section travel during a trolley section travel even when the travel route of the vehicle 100 has a plurality of trolleyless sections having different interval lengths. In addition, it is possible to notice a failure of a component used for the first time in a trolleyless section travel after entering the trolleyless section. Therefore, it is possible to avoid a possible significant delay in a schedule diagram that may be generated when the vehicle 100 is stuck.

Third Embodiment

Figure 20:
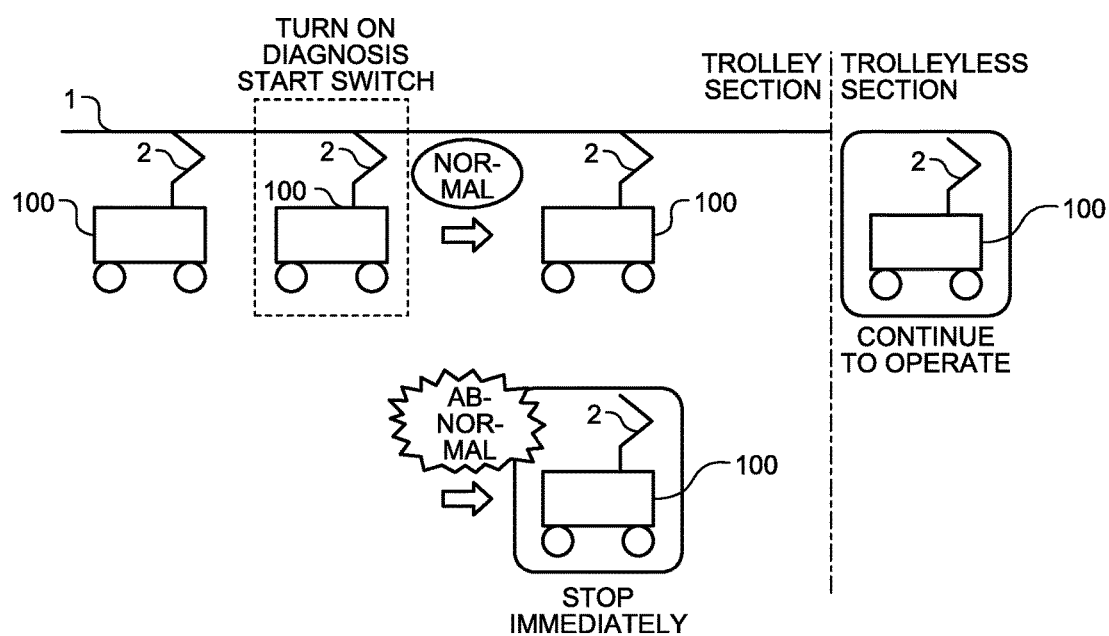
FIG. 20 is a diagram schematically illustrating a vehicle system according to a third embodiment.
Figure 21:
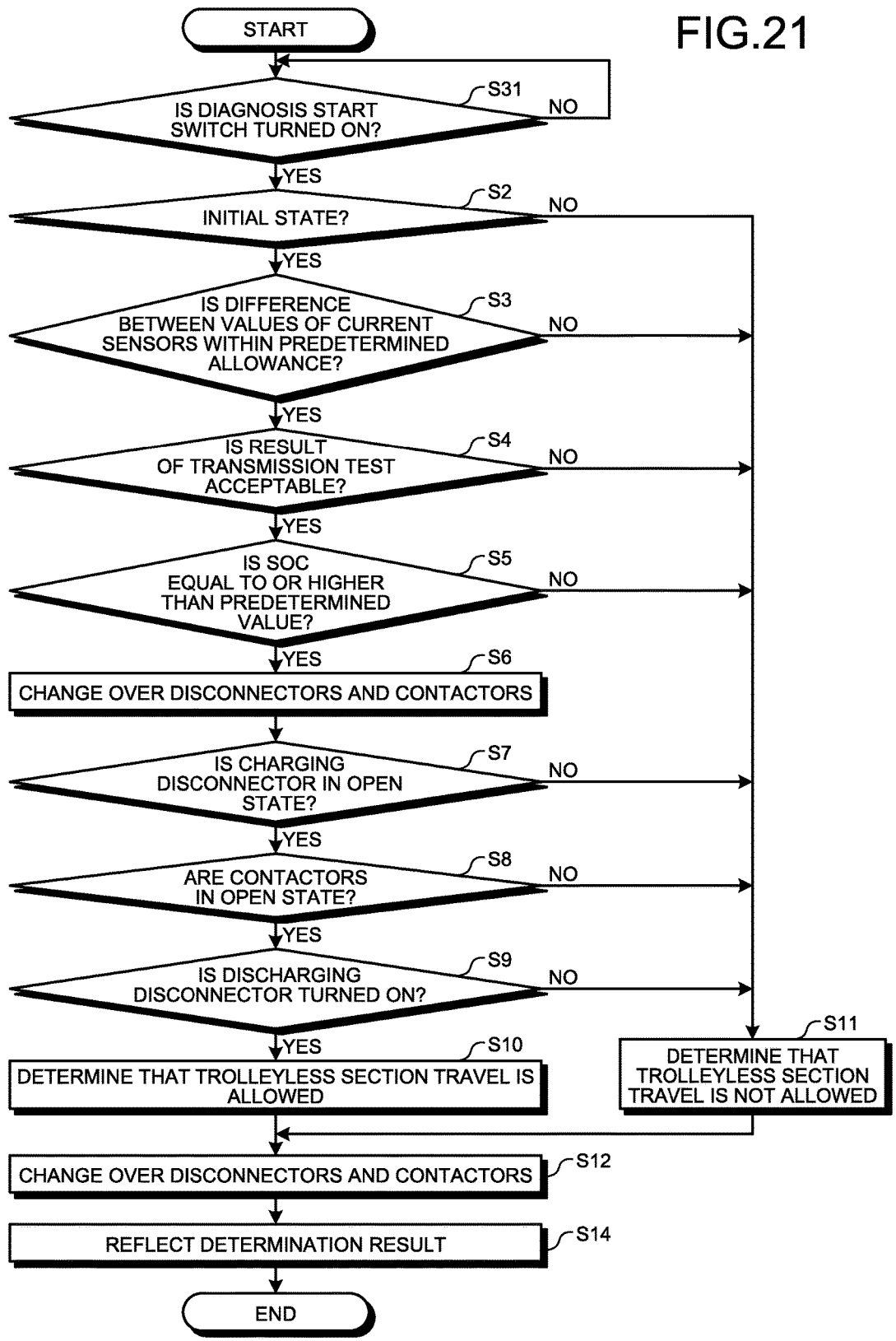
FIG. 21 is an operational flowchart illustrating operations of a diagnosis circuit of the vehicle system according to the third embodiment.
Figure 22:
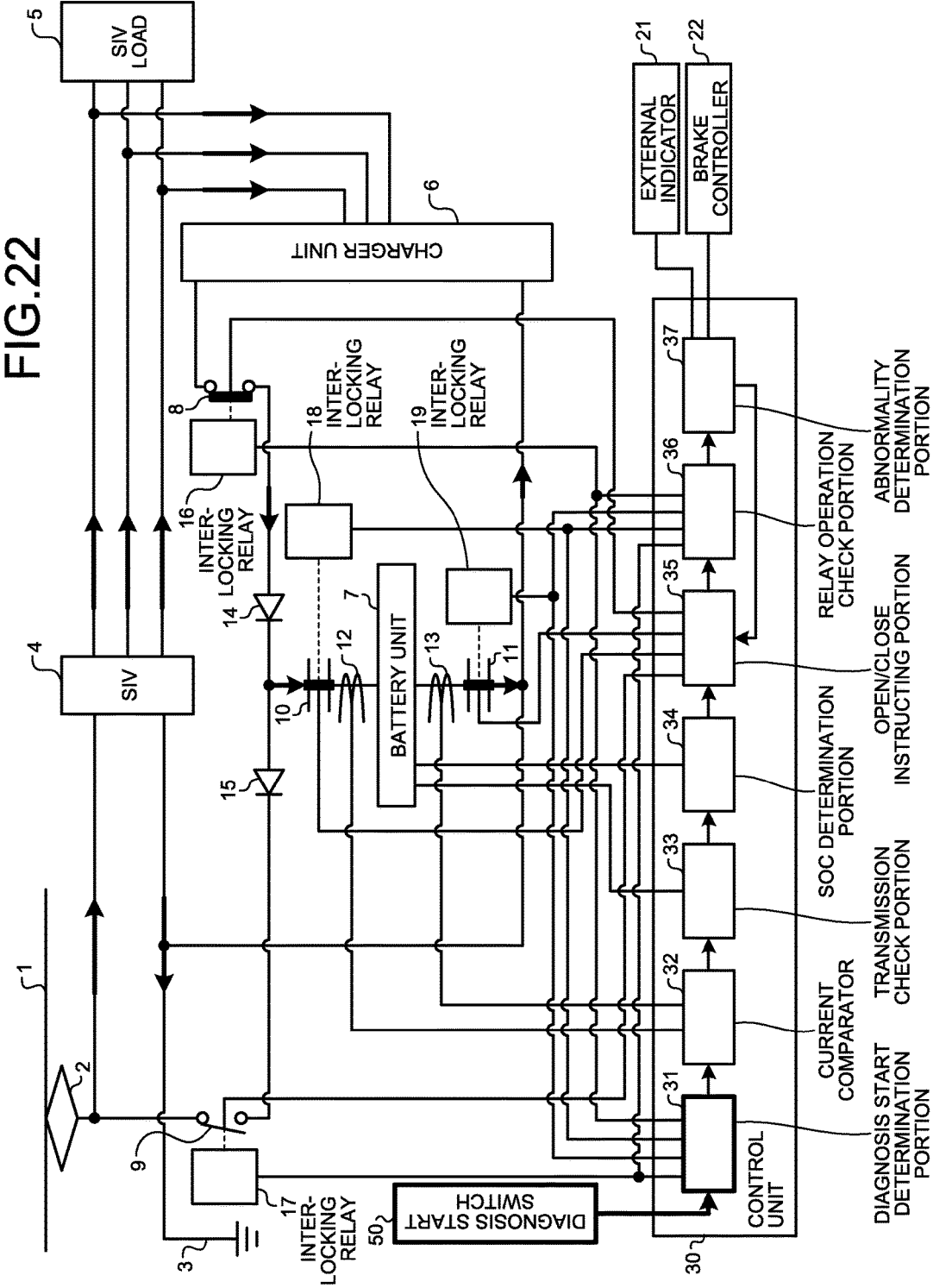
FIG. 22 is a diagram illustrating a circuit operation unique to the third embodiment.

Next, a third embodiment will be described in detail with reference to FIGS. 20 to 22. FIG. 20 is a diagram schematically illustrating a vehicle system according to the third embodiment. FIG. 21 is a flowchart illustrating the operation of the diagnosis circuit in the vehicle system according to the third embodiment. FIG. 22 is a diagram illustrating a circuit operation unique to the third embodiment. Note that like reference numerals denote like elements throughout FIGS. 1 to 17, and they will not be described repeatedly.

The third embodiment is different from the first embodiment in that the diagnosis can be started by the vehicle 100 in an arbitrary time, and a mechanism for indicating a timing for reflecting the diagnosis result is different. These differences will now be described in more detail.

According to the third embodiment, the diagnosis start wayside coil 40 that indicates the diagnosis start timing, the diagnosis result reflecting wayside coil 41 that indicates the timing for reflecting the diagnosis result, and the on-vehicle transponder 20 that receives a signal from the wayside coil are omitted. Instead, a diagnosis start switch 50 is provided to allow the diagnosis to start at an arbitrary timing (FIG. 22).

According to the third embodiment, the ON state of the diagnosis start switch 50 is transmitted to the diagnosis start determination portion 31 (FIG. 22). The diagnosis start determination portion 31 has a standby state until the diagnosis start switch 50 is turned on (No in S31, and the process returns to S31). Then, as the diagnosis start switch 50 is turned on (Yes in S31 of FIG. 21), the diagnosis described above similar to that of the first embodiment starts. The diagnosis result is reflected immediately as soon as the diagnosis is completed. Note that, according to the third embodiment, since the diagnosis start wayside coil 40, the diagnosis result reflecting wayside coil 41, and the on-vehicle transponder 20 are omitted, the processes of S1 and S13 of FIG. 4 are omitted as illustrated in FIG. 21.

Using the vehicle system according to the third embodiment described above, it is possible to diagnose operability of a component used in a trolleyless section travel at an arbitrary timing during a non-travel state such as a standby state or a stop state as well as during a travel state. In addition, it is possible to notice a failure of a component used for the first time in a trolleyless section travel after entering the trolleyless section and avoid a possible significant delay in a schedule diagram that may be generated when the vehicle 100 is stuck. Note that, while the vehicle 100 travels on a trolley section, the diagnosis is started to reflect the diagnosis result before entering the trolleyless section. Therefore, a beacon or the like for indicating the diagnosis start timing may be provided to allow an operator (driver) to turn on the diagnosis start switch 50 in response to the beacon.

As described above, according to the first to third embodiments, operability of a component used in a trolleyless section travel is diagnosed during a trolley section travel (before entering the trolleyless section). When it is impossible to check the operability, the trolleyless section travel is not allowed. Therefore, it is possible to minimize confusion in a schedule diagram that may be generated when the component used in the trolleyless section fails.

While several embodiments of the present invention have been described, it would be appreciated that these embodiments are just for illustrative purposes and are not intended to limit the scope of the invention. They may be embodied in other various forms, and various omissions, modifications, or substitutions may also be possible without departing from the scope and spirit of the invention. The accompanying claims and their equivalents are intended to cover such forms or modifications as would fall within the scope and spirit of the invention.

The invention claimed is:

1. A vehicle system comprising:
   a battery unit serving as a power source in a trolleyless section;
   a charging disconnector and a discharging disconnector for changing over a charging/discharging state of the battery unit;
   a pair of contactors provided in positive and negative sides of the battery unit;
   a plurality of relays interlocking with open/close operations of each of the charging disconnector, the discharging disconnector, and the pair of contactors;
   an open/close instructing portion that issues open/close instructions for the charging disconnector, the discharging disconnector, and the pair of contactors;
   a diagnosis start determination portion that determines a diagnosis start timing before entering a trolleyless section;
   a remaining battery capacity check portion that operates when the diagnosis start determination portion determines that it is a diagnosis start timing, and checks whether or not the battery unit has a battery capacity necessary for a trolleyless section travel;
   a relay operation check portion that operates when the diagnosis start determination portion determines that it is the diagnosis start timing, and checks operability of the charging disconnector, the discharging disconnector, and the pair of contactors based on certain open/close states of the plurality of relays depending on the open/close instructions from the open/close instructing portion;
   a transmission check portion that operates when the diagnosis start determination portion determines that it is the diagnosis start timing, and checks operability of a transmission line to the battery unit by transmitting a transmission test signal to the battery unit and checking whether a normal response is received; and
   an abnormality determination portion that operates when the diagnosis start determination portion determines that it is the diagnosis start timing, and determines that the trolleyless section travel is not allowed when any one of a result of the operability check by the relay operation check portion, a result of the battery capacity check by the remaining battery capacity check portion, and a result of the operability check by the transmission check portion is negative.

2. The vehicle system according to claim 1, wherein the relay operation check portion checks operability of the charging disconnector, the discharging disconnector, and the pair of contactors by checking whether or not the plurality of relays has states corresponding to the open/close states of the charging disconnector, the discharging disconnector, and the pair of contactors after the open/close instructing portion sequentially issues open/close instructions for opening the charging disconnector, opening the pair of contactors, and turning on the discharging disconnector.

3. The vehicle system according to claim 1, further comprising an indicator that indicates a result of the determination of the abnormality determination portion.

4. The vehicle system according to claim 1, further comprising:
   a current sensor that detects an electric current flowing to the battery unit and a current sensor that detects an electric current flowing from the battery unit; and
   a current comparator that operates when the diagnosis start determination portion determines that it is a diagnosis start timing, the current comparator comparing current values detected by the pair of current sensors to check operability of the pair of current sensors,
   wherein the abnormality determination portion determines that the trolleyless section travel is not allowed when either the result of the operability check by the relay operation check portion or a result of the operability check by the current comparator is negative.

5. The vehicle system according to claim 4, wherein the remaining battery capacity check portion checks whether or not the battery unit has a remaining battery capacity necessary for the trolleyless section travel by estimating a stateof-charge (SOC) based on a current value detected by any one of the pair of current sensors.

6. The vehicle system according to claim 1, wherein the diagnosis start determination portion determines that it is a diagnosis start timing when an on-vehicle transponder mounted on the vehicle receives a signal indicating the diagnosis start timing from a wayside coil.

7. The vehicle system according to claim 6, wherein, if the abnormality determination portion determines that the trolleyless section travel is not allowed, a braking instruction is output when the on-vehicle transponder mounted on the vehicle receives a signal from the wayside coil indicating a timing for reflecting the determination result of the abnormality determination portion in order to stop the vehicle before entering the trolleyless section.

8. The vehicle system according to claim 1, wherein the diagnosis start determination portion receives a signal from a diagnosis start switch mounted on the vehicle and determines that it is a diagnosis start timing when the diagnosis start switch is pressed.

9. The vehicle system according to claim 8, wherein the abnormality determination portion immediately outputs a braking instruction when it is determined that the trolleyless section travel is not allowed.

10. A method for controlling a vehicle system provided with a battery unit serving as a power source in a trolleyless section, a charging disconnector and a discharging disconnector for changing over a charging/discharging state of the battery unit, a pair of contactors provided in positive and negative sides of the battery unit, a plurality of relays that interlocks with open/close operations of each of the charging disconnector, the discharging disconnector, and the pair of contactors, the method comprising:

issuing open/close instructions to the charging disconnector, the discharging disconnector, and the pair of contactors;

determining a diagnosis start timing before entering a trolleyless section;

checking whether or not the battery unit has a remaining battery capacity necessary for a trolleyless section travel when determining that it is the diagnosis start timing;

checking first operability of the charging disconnector, the discharging disconnector, and the pair of contactors based on certain open/close states of the plurality of relays depending on the open/close instructions;

checking second operability of a transmission line to the battery unit by transmitting a transmission test signal to the battery unit and checking whether a normal response is received, when determining that it is the diagnosis start timing; and determining that the trolleyless section travel is not allowed when any one of a result of the first operability check, a result of the battery capacity check, and a result of the second operability check is negative.

* * * * *